US012368716B1

(12) United States Patent
Goel et al.

(10) Patent No.: US 12,368,716 B1
(45) Date of Patent: Jul. 22, 2025

(54) VERIFYING TRANSLATED ACCESS CONTROLS FOR APPLICATION MODERNIZATION

(71) Applicant: Amazon Technologies, Inc., Seattle, WA (US)

(72) Inventors: Amit Goel, Portland, OR (US); Chungha Sung, Cupertino, CA (US); Mary Southern, Minneapolis, MN (US); Didier Germain Durand, Jougne (FR); Neha Rungta, San Jose, CA (US); Brad E Marshall, Bainbridge Island, WA (US); Zhe Li, Montvale, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 18/215,436

(22) Filed: Jun. 28, 2023

(51) Int. Cl.
*H04L 9/40* (2022.01)
*H04L 41/22* (2022.01)

(52) U.S. Cl.
CPC ............ *H04L 63/101* (2013.01); *H04L 41/22* (2013.01); *H04L 63/105* (2013.01)

(58) Field of Classification Search
None
See application file for complete search history.

(56) References Cited

U.S. PATENT DOCUMENTS

| 9,172,621 | B1 * | 10/2015 | Dippenaar | .......... | H04L 41/0879 |
| 10,171,310 | B2 * | 1/2019 | Hernandez | .......... | H04L 41/0816 |
| 10,785,128 | B1 * | 9/2020 | Bawcom | .................... | G06F 8/38 |
| 11,108,828 | B1 * | 8/2021 | Curtis | .................... | H04L 63/104 |
| 11,870,647 | B1 * | 1/2024 | Zhang | .................. | H04L 41/5051 |
| 11,930,013 | B1 * | 3/2024 | Zhang | .................. | G06F 16/9024 |
| 11,947,939 | B1 * | 4/2024 | Longmore | .............. | G06F 8/433 |
| 2016/0156664 | A1 * | 6/2016 | Nagaratnam | ........... | H04L 63/20 |
| | | | | | 726/1 |
| 2021/0136083 | A1 * | 5/2021 | Gordon | .................... | G06F 21/10 |

(Continued)

OTHER PUBLICATIONS

Capgemini, "The App-Modernization Manual—The Definitive Guide to Intelligent Apps", Available Online at <https://www.capgemini.com/in-en/wp-content/uploads/sites/6/2021/05/Capgemini_app_modernization_manual_1_.pdf>, 2021, 52 pages.

(Continued)

*Primary Examiner* — Scott B Christensen
(74) *Attorney, Agent, or Firm* — Nicholson DeVos Webster & Elliott LLP

(57) ABSTRACT

Computer-implemented techniques for verifying translated access controls for application modernization include an application modernization service of a provider network obtaining a source access control. The service translates the source access control to a target access control. The service compiles the source access control and the target access control into respective automated reasoning solver encodings. The service uses the automated reasoning solver encoding to query an automated reasoning solver such as a Satisfiability Modulo Theories (SMT) solver to determine whether the source access control is less or more permissive than the target access control representing a security issue or an availability issue with the target access control, respectively.

20 Claims, 10 Drawing Sheets

(56) References Cited

U.S. PATENT DOCUMENTS

2022/0377077 A1* 11/2022 Gokhale ............... G06F 16/119

OTHER PUBLICATIONS

Deloitte, "Application Modernization: innoWake Modernization", Available Online at <https://www2.deloitte.com/content/dam/Deloitte/us/Documents/technology/us-technology-application-modernization-innowake-modernization.pdf>, 2019, 2 pages.

New Relic, Inc., "The Enterprise Guide to Continuous Application Modernization", Available Online at <https://newrelic.com/sites/default/files/2021-08/enterprise-guide-continuous-application-modernization.pdf>, 2020, 19 pages.

New Relic, Inc., "The Enterprise Guide to Continuous Application Modernization", Available Online at <https://pages.awscloud.com/rs/112-TZM-766/images/AWSMP_newrelic_enterprise_guide_continuous_app_modernization_Sep.pdf>, 2019, 23 pages.

* cited by examiner

VERIFYING TRANSLATED ACCESS CONTROLS FOR APPLICATION MODERNIZATION

BACKGROUND

Today, cloud computing platforms offer a wide range of infrastructure services, such as computing power, storage options, and networking solutions. These platforms enable their customers to host their applications and data in the cloud, allowing them to scale resources up or down as needed, pay only for what they use, and avoid the upfront costs and complexity of building and maintaining their own physical and application infrastructure. These platforms offer a wide range of application infrastructure services, such as virtual server services, application container services, serverless computing services, cloud data storage services, networking and connectivity services, database services, machine learning services, data analytic services, among other web or application services.

One type of application infrastructure service that may be offered by a cloud computing platform to its customers is an application modernization service. An application modernization service supports customers in migrating their existing computing applications to the cloud computing platform. For example, the application modernization service may assist customers in migrating a mainframe computing application to a functionally equivalent cloud computing application that runs on the cloud computing platform.

A technical challenge for an application modernization service migrating an existing computing application to a cloud computing platform is the migration of access controls from the existing application to the cloud computing application. The existing computing platform and the cloud computing platform may use similar, yet different, mechanisms for access control. For example, both platforms may function to control access by users to resources, meaning they functionally control who has access to what in their respective computing platforms. Nonetheless, the application modernization service may need to translate access controls specified in a "source" format used by the existing computing platform to equivalent access controls in a "target" format used by the cloud computing platform.

A technical challenge lies in verifying that the access controls in the target format implement the same access control policy as the translated source access controls. For example, if the translation is imprecise, then access that was not allowed by the existing computing platform may be allowed by the cloud computing platform, resulting in a security issue. Conversely, access that was allowed by the existing computing platform may not be allowed by the cloud computing platform, resulting in an availability issue.

BRIEF DESCRIPTION OF DRAWINGS

Various embodiments in accordance with the present disclosure will be described with reference to the drawings, in which.

DETAILED DESCRIPTION

Figure 1:
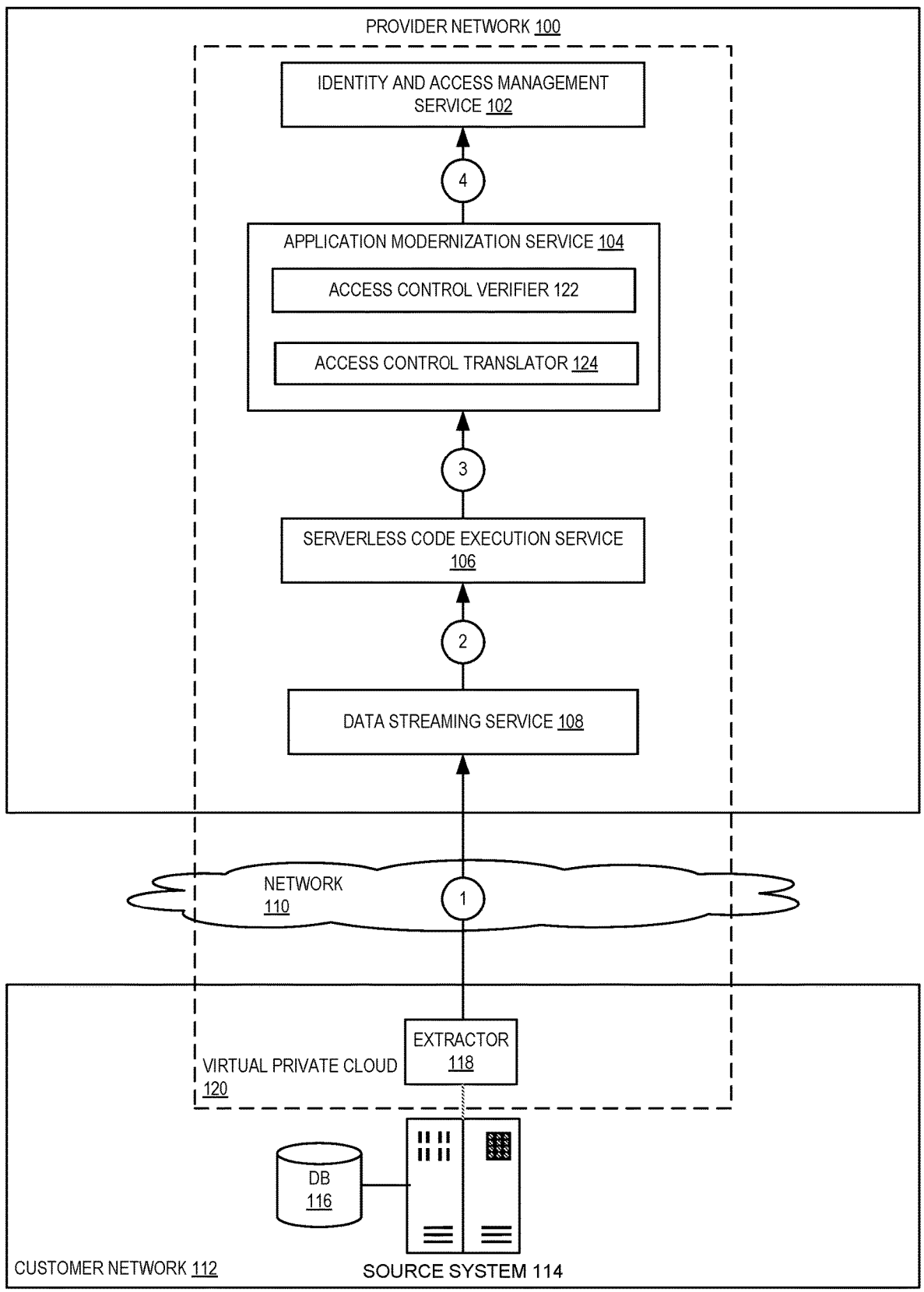
FIG. 1 illustrates an example system and method for verifying translated access controls for application modernization, according to some embodiments.

The present disclosure relates to methods, apparatus, systems, and non-transitory computer-readable storage media (collectively, "techniques") for verifying that translated access controls in a "target" access control format are equivalent to access controls in a "source" access control format from which the target access controls where translated.

Many mainframe computer systems have security capabilities for access control. One such capability of many mainframe computer systems is commonly referred to as an External Security Manager (ESM). The ESM system can programmatically answer who has access to what in the mainframe system. Examples of commercial EMS's include the RESOURCE ACCESS CONTROL FACILITY (RACF) from INTERNATIONAL BUSINESS MACHINES (IBM) of Armonk, New York and the ACCESS CONTROL FACILITY 2 (ACF2) and the TOP SECRET ESM available from BROADCOM of San Jose, California.

A technical challenge for an application modernization service migrating an existing mainframe computing application to a cloud computing platform is the migration of ESM access controls from the mainframe application to the cloud computing application. The mainframe computing platform and the cloud computing platform may use similar, yet different, mechanisms for access control. For example, both platforms may function to control access by users to resources, meaning they functionally control who has access to what in their respective computing platforms.

Nonetheless, the application modernization service may need to translate access controls specified in an ESM format used by the mainframe computing platform to equivalent access controls in a "target" format used by the cloud computing platform. A technical challenge lies in verifying that the access controls in the target format implement the same access control policy as the ESM access controls. For example, if the translation is imprecise, then access that was not allowed by the mainframe computing platform may be allowed by the cloud computing platform, resulting in a security issue. Conversely, access that was allowed by the mainframe computing platform may not be allowed by the cloud computing platform, resulting in an availability issue.

Techniques disclosed herein address these and other issues. In some embodiments, the techniques are implemented by an application modernization service in a provider network and include the server obtaining a source access control. The service translates the source access control to a target access control. The service compiles the source access control and the target access control into respective logical solver encodings. The service uses the logical solver encoding to query a logical solver such as an automated reasoning solver to determine whether the source access control is less or more permissive than the target access control representing a security issue or an availability issue with the target access control, respectively.

Example System and Method for Verifying Translated Access Controls

FIG. 1 illustrates an example provider network environment in which techniques for verifying translated access controls are implemented.

Provider network 100 (equivalently "cloud provider network 100") offers users and customers convenient, on-demand network access to a shared pool of configurable resources that are programmatically provisioned and released in response to user and customer commands.

The offered resources may include any or all of computing resources, data storage resources, networking resources, application resources, access control resources, identity management resources, machine learning resources, or any other suitable computing-related resources.

Computing resources include resources that provide the ability to perform computational tasks such as virtual machines (VMs), containers, or serverless functions. Users and customers may launch and manage computing resources to run applications, process data, perform calculations, or accomplish other computations according to the requirements of the implementation at hand.

A virtual machine refers to a software emulation of a physical computer, allowing a single physical machine to run multiple operating systems or instances of an operating system. It functions as a self-contained entity with its own virtual hardware, including processors, memory, storage, and network interfaces.

A container, on the other hand, is a lightweight and portable software package that includes all the necessary components to run an application, such as code, runtime, system tools, libraries, and dependencies. Containers provide application-level isolation, allowing applications to run independently on the same virtual machine or physical machine without interference. Each container has its own file system, network stack, and runtime environment to ensure that the application and its dependencies are contained and isolated.

The concept of serverless functions will be further elaborated in relation to the serverless code execution service 106.

Data storage resources include resources that offer data storage space to users and customers for storing data objects. These data objects can store files, databases, or any other type of data. The organization of data objects can vary and may include the following approaches:

Hierarchical organization: Data objects are organized in a tree-like or file-folder file system-like structure.

Object-based organization: Data objects are assigned unique identifiers or keys and stored in a flat structure. They can also be grouped into logical collections or buckets.

Metadata-based organization: Data objects are described by attributes such as tags, labels, timestamps, or custom-defined properties.

Indexed organization: A searchable structure maps key or attribute information to corresponding data objects, enabling fast search and retrieval.

Partitioned or sharded organization: Data objects are distributed across multiple data storage resources based on specific criteria, such as range-based partitioning or hashing, to improve data access performance and increase availability.

Replicated organization: Multiple copies or representations of data objects are created across different data storage nodes or locations to increase data availability, fault tolerance, and data access performance.

These are examples of data object organization schemes, but other suitable approaches may exist as well.

Networking resources enable the establishment and management of network connections. These resources encompass virtual networks, subnets, load balancers, firewalls, routing capabilities, and other suitable networking components. One specific type of networking resource that may be offered by provider network 100 is a virtual private cloud (VPC) 120.

VPC 120 refers to a logically isolated virtual network within the infrastructure of provider network 100. It provides network isolation by allowing users or customers to define their own private IP address ranges, subnets, and routing tables. This isolation ensures that the resources within VPC 120 are separate and inaccessible from other VPCs or the public by default. Users or customers have control over the configuration of provider network 100 within VPC 120.

VPC 120 also offers the ability to set up virtual private network (VPN) connections or direct links, enabling secure connections between the user's or customer's on-premises infrastructure and the VPC. Security features provided by VPC 120 may include network access control lists (ACLs), security groups to define inbound and outbound traffic, network-level encryption, monitoring tools, and other suitable security measures.

Furthermore, VPC 120 allows users or customers to scale resources up or down based on demand. Scaling operations within VPC 120 may involve adding or removing subnets, allocating IP addresses, or other suitable scaling operations. Secure connectivity options such as VPC peering, VPN connections, dedicated network connections, or other suitable options can be used to connect VPC 120 to other VPCs within provider network 100 or to an on-premises network (e.g., network 112).

Provider network 100 supports seamless integration of VPCs with other services offered by the provider. This enables access from within VPC 120 to services such as virtual machine services, database services, data storage services, load balancing services, and other suitable resources within provider network 100. Application resources facilitate the deployment and execution of user and customer applications. Application resources include resources for hosting web applications, application programming interfaces (APIs) for integrating with other services in provider network 100, tools for managing application lifecycles, or other suitable application resources.

Access control resources provide mechanisms for managing user permissions and enforcing security policies. These resources enable users and customers to control who can access what resources and what actions they can perform on those resources.

Machine learning resources provide frameworks, libraries, and infrastructure for the development and execution of machine learning models. These resources encompass various components such as pre-trained models, model training environments, tools for data preprocessing and analysis, and other suitable machine learning resources.

Users and customers of provider network 100 utilize their computing devices to interact with the network via an interface, which can take the form of application programming interface (API) calls, a graphical user interface (GUI) console implemented as a website, web application, or mobile application, a command line interface (CLI), a software development kit (SDK), and more.

An API serves as a programmatic interface or network communication protocol between a client and a server. By making requests in a predefined format, the client expects to receive a response in a specific format or initiate a defined action. In the context of provider network 100, an API acts as a gateway for users and customers to access resources within the network. It allows them to retrieve data from, send data to, or trigger actions within provider network 100. This enables users and customers to develop applications that interact with resources and services offered by provider network 100. APIs can also facilitate data exchange between services within provider network 100.

In some embodiments, provider network 100 comprises multiple regions. A region refers to a geographical area where the operator of provider network 100 operates one or more data centers. Each data center is a physical building or enclosure that houses computing devices and provides power and cooling infrastructure for the operation of provider network 100.

To ensure connectivity and communication between regions, a global network is established. This global network consists of private networking infrastructure, such as fiber connections controlled by the operator of provider network 100. These connections interconnect each region with at least one other region within provider network 100.

In some embodiments, a region is divided into multiple availability zones, which are interconnected through a private high-speed network, such as a fiber communication connection. An availability zone serves as an isolated failure domain within a region, comprising one or more data center facilities with separate power, networking, and cooling infrastructure from other availability zones within the same region.

The purpose of having availability zones is to ensure redundancy and resilience. By positioning availability zones geographically apart within a region, such as in different cities, the impact of a natural disaster or failure-inducing event (e.g., extended power grid failure) is minimized. This means that a failure in one availability zone does not cause all availability zones in the region to fail simultaneously, thereby enhancing the overall availability and reliability of the services provided within the region.

In some embodiments, users and customers establish a connection to an availability zone within provider network 100 through a publicly accessible network, such as the internet or a cellular communication network. This connection is facilitated via a transit center, which serves as a primary backbone location linking users and customers to provider network 100.

A transit center may be co-located at other network provider facilities, including internet service providers (ISPs) or telecommunications providers. It is securely connected to the availability zone, typically through a virtual private network (VPN) or direct connection. To ensure redundancy and high availability, multiple transit centers may be operated within a region.

Having multiple transit centers enhances the reliability of connections and provides backup options in case of failures or disruptions in one transit center. This redundancy helps ensure continuous and reliable connectivity between users, customers, and the availability zones within provider network 100.

In some embodiments, provider network 100 delivers content from points of presence (POPs) that are located outside of provider network 100 but are networked with it. This content delivery is facilitated through edge locations and regional edge cache servers.

The utilization of edge locations and regional edge cache servers allows for the compartmentalization and geographic distribution of computing hardware. This approach enables provider network 100 to offer low-latency access to resources for users on a global scale. It also ensures a high degree of fault tolerance and stability in the network's operations.

In some embodiments, provider network 100 delivers content from points of presence (POPs) that are located outside of provider network 100 but are networked with it. This content delivery is facilitated through edge locations and regional edge cache servers.

The utilization of edge locations and regional edge cache servers allows for the compartmentalization and geographic distribution of computing hardware. This approach enables provider network 100 to offer low-latency access to resources for users on a global scale. It also ensures a high degree of fault tolerance and stability in the network's operations.

Identity and access management service 102 enables users and customers to efficiently manage access to the resources provisioned to them within provider network 100. This management encompasses various tasks, including: Creation and management of user accounts: Users and customers can create and manage accounts for individuals who require access to the provisioned resources. Assignment of specific permissions and access levels: Service 102 allows for the assignment of granular permissions and access levels to these user accounts, ensuring that individuals have appropriate access rights based on their roles and responsibilities. Control of authentication and authorization: Users and customers can control the authentication and authorization mechanisms employed for the provisioned resources within provider network 100, ensuring secure and authorized access. Creation of individual user accounts for employees: Individual user accounts can be created for employees, allowing for personalized access and resource management. Granting appropriate access to provisioned resources: Based on their roles and responsibilities, employees can be granted appropriate access to the provisioned resources and services within provider network 100. Creation of access control groups: Access control groups can be created to simplify access management, grouping users with similar access requirements together for efficient administration. Configuration of multi-factor authentication: Additional security measures such as multi-factor authentication can be configured to enhance the authentication process and ensure greater security for the provisioned resources. Configuration of password rotation policies: Password rotation policies can be set up to enforce regular password changes, enhancing security and reducing the risk of unauthorized access. These are examples of the identity and access management tasks that can be performed using the service, but other suitable tasks may also be supported.

Application modernization service 104 enables users and customers to seamlessly migrate their on-premises computing applications, including on-premises mainframe computing applications, to corresponding cloud applications running within provider network 100. Service 104 provides tools and an application programming interface (API) to facilitate this migration process, which may include the following tasks: Analysis of on-premises applications and dependencies: Service 104 allows for the assessment and planning of on-premises applications, including analyzing their dependencies and determining the necessary steps for migration. Development of cloud applications: Users and customers can develop cloud applications specifically tailored for migration, modernization, and ongoing maintenance within provider network 100. Creation of runtime environments and deployment: Service 104 assists in creating the necessary runtime environments within provider network 100 and facilitates the deployment of the cloud applications to these environments. Management and operation of cloud applications: Once migrated, service 104 enables the management and operation of the cloud applications within provider network 100, ensuring their efficient functioning. These tasks encompass various aspects of the application migration process, but other suitable tasks may also be supported by the application modernization service 104.

Serverless code execution service 106, also known as "on-demand code execution service," "function compute service," "functions service," "cloud functions service," "functions as a service," or "serverless computing service," allows users and customers of provider network 100 to execute their code on computing resources provided by the network without the need to select or manage the underlying computing resources.

By utilizing serverless code execution service 106, a user or customer can upload their code to provider network 100 and utilize an application programming interface (API) to request that the service identifies, provisions, and manages the necessary computing resources required to run the code. In this way, a "serverless" function refers to code, provided by a user, customer, or another entity (such as provider network 100 itself), that can be executed on-demand.

Serverless code execution service 106 offers the convenience of executing code without the burden of infrastructure management. Users and customers can focus solely on their code logic, relying on the service to handle the underlying computing resources and ensure efficient code execution as needed.

In some embodiments, a serverless function is hosted within provider network 100 by serverless code execution service 106 and can be associated with a specific user, customer, or made accessible to multiple users or customers. The serverless function can be assigned a Uniform Resource Locator (URL), Uniform Resource Identifier (URI), or another reference that can be used to invoke the function.

When triggered or invoked, a serverless function is executed by a computing resource such as a virtual machine, container, or similar component. Invocation can be achieved through an application programming interface (API) call or a specially formatted Hyper Text Transport Protocol (HTTP/S) request message.

By leveraging this approach, users and customers have the ability to define serverless functions that can be executed on demand, without the need to maintain dedicated infrastructure for their execution. Instead, the serverless functions are executed on demand utilizing resources managed by provider network 100. These resources can be kept in a "ready" state, pre-initialized with a runtime environment configured to execute the serverless functions, allowing for near real-time execution.

Data streaming service 108 facilitates the delivery of data notifications to subscribers or endpoints using various messaging protocols. This service supports event-driven application architectures, enabling real-time or near real-time communication between applications and services. Data streaming service 108 offers a range of features, including: Topic/channel-based publish/subscription: Publishers send messages to specific topics/channels, and subscribers receive messages from the topics/channels to which they have subscribed. Message filtering: Subscribers can receive a subset of messages from a subscribed topic/channel based on filtering rules defined by message attributes. This allows for targeted and customized message delivery. Message delivery reattempts: In cases where message delivery fails initially, data streaming service 108 automatically reattempts the delivery to ensure reliable message delivery. Messaging fanout: Data streaming service 108 distributes messages sent to a topic to multiple subscribers. This enables scalable message delivery and ensures that multiple recipients receive the messages simultaneously. These features provided by data streaming service 108 enhance the efficiency, flexibility, and reliability of data notifications, supporting real-time communication and event-driven architectures for applications and services.

In some embodiments, customer network 112 refers to an on-premises network or computer network that is built and maintained within the physical premises or data center of a business, company, or organization. The organization owns and operates the network infrastructure, which may include mainframe systems (e.g., source system 114), servers, switches, routers, firewalls, data storage systems (e.g., database 116), and potentially other components.

With an on-premises network, the organization has significant control over the design, implementation, and management of the network. This level of control can be advantageous for organizations that prioritize data control, compliance, or specific security requirements. However, building and managing an on-premises network requires substantial investment by the organization.

Organizations seek solutions that allow them to combine their on-premises infrastructure with cloud services, leveraging the benefits of both models. This includes advantages such as enhanced security, scalability, flexibility, and cost optimization. The techniques described herein support these solutions by ensuring the accurate translation of source access controls used by source system 114 in corporate network 112 to the target access controls used by identity and access management service 102 within provider network 100.

In some embodiments, source system 114 refers to a mainframe computer system. Specifically, it can be a mainframe computer system running the Z/OS operating system, such as the Z14 or Z15 mainframe system. The Z/OS operating system is provided by INTERNATIONAL BUSINESS MACHINES (IBM) of Armonk, New York. Source system 114 is capable of processing mission-critical mainframe workloads that involve highly valuable and confidential data.

For instance, in the finance or banking industry, source system 114 may be utilized for various purposes, including large-scale transaction processing, secure data storage, real-time analytics, core banking systems, payment processing, fraud detection, risk management, and other relevant financial institution or bank data processing workloads. Similarly, an insurance company may employ source system 114 for tasks such as policy management, claims processing, actuarial calculations, underwriting, and other related insurance industry data processing workloads.

In the healthcare industry, source system 114 may play a role in managing electronic health records (EHRs), patient data, medical billing, healthcare information systems, and other pertinent healthcare data processing workloads. Government organizations may utilize source system 114 for tax processing, social security administration, voter registration, public safety systems, and other government data processing workloads. In the transportation and logistics sector, source system 114 can be involved in managing ticketing and reservation systems, cargo tracking, supply chain management, fleet management, and other relevant transportation and logistics data processing workloads.

Retail organizations may employ source system 114 as a point-of-sale (POS) system, for inventory management, order processing, supply chain optimization, and other applicable retail data processing workloads. These examples illustrate some of the potential data processing workloads and industries that may utilize source system 114. Additionally, source system 114 may be utilized by users in other industries, including telecommunications, energy, manufacturing, and more.

Security on source system 114 is maintained through the use of an External Security Manager (ESM) system that governs access to resources and enforces security policies. One such ESM that source system 114 may utilize for access control and security enforcement is the Resource Access Control Facility (RACF). ESM is a software product that offers access control mechanisms to safeguard the resources within source system 114. These resources include datasets, programs, transactions, and system functions.

ESM performs various security functions, including user authentication, authorization, and access auditing on source system 114. User authentication is carried out by verifying credentials such as user identifiers/names and passwords before granting access to the protected resources. ESM supports multiple authentication methods, such as password-based authentication, digital certificates, and token-based authentication.

In terms of access control, ESM defines and manages user privileges and permissions by using profiles that represent resources and a set of rules. These profiles and rules determine which users, groups, or roles have specific actions or operations permitted on the protected resources of source system 114.

ESM provides a range of security administration features that allow administrators to define and manage security policies. These features include creating user profiles, implementing password rules, setting resource access rules, enabling audit logging, and performing other tasks such as user provisioning, revoking user access, and generating security reports.

To ensure comprehensive security monitoring and compliance, ESM captures security-related events and activities within source system 114 and maintains them in audit logs. These logs enable administrators to monitor and review user actions, identify security violations or suspicious activities, and maintain an audit trail for compliance and forensic purposes.

ESM integrates with various components of source system 114, including the Z/OS operating system, system utilities, and subsystems. This integration ensures consistent enforcement of security controls throughout the source system 114 environment, maintaining a unified and robust security framework.

While in some embodiments the ESM system of source system 114 is a Resource Access Control Facility (RACF) system, the ESM system is another ESM system used to control access to resources and enforce security policies within the Z/OS operating system in other embodiments. For example, the ESM system can be the TOP SECRET system or the ACCESS CONTROL FACILITY 2 for Z/OS (ACF2) system both provided by BROADCOM INC. of San Jose, California. Thus, while the disclosed techniques are illustrated by RACF examples, it should be understood that the techniques can be used with ESM systems other than RACF such as the aforementioned TOP SECRET or ACF2.

In some embodiments, the primary objective of ESM access control is to authenticate users and safeguard data sets, as well as other data or processing resources within source system 114, from unauthorized use, destruction, modification, or disclosure, whether intentional or accidental. Additionally, ESM can be employed to centrally manage the security of peripheral servers, accessible through the Lightweight Directory Access Protocol (LDAP). The wealth of user, group, and profile information contained in ESM data is valuable for applications in different environments or on diverse systems.

To facilitate integration with other systems, the ESM information accessible through the system authorization facility (SAF) interfaces of the Z/OS operating system within source system 114 can be made available via the Z/OS LDAP server. This enables programs, both within and outside the Z/OS environment, such as the extractor 118, to access ESM information, expanding its utility beyond the confines of the Z/OS environment.

In some embodiments, the system authorization facility (SAF) within the Z/OS operating system of source system 114 serves as a centralized interface that directs control to the ESM. A crucial element utilized by SAF is the Z/OS router, which acts as a central point of control for system products responsible for resource management. Components of these system products can make calls to the Z/OS router at designated control points to obtain necessary information for access control decisions.

The Z/OS router identifies these calls and determines that they should be handled by SAF. Consequently, SAF serves as the singular interface that system products invoke in order to communicate with the ESM. This enables processing to occur seamlessly at the respective control points, leveraging the capabilities of the ESM through SAF's unified interface.

In some embodiments, database 116 is responsible for storing various objects that configure the security of source system 114, including ESM objects. These ESM objects encompass user profiles, group profiles, dataset profiles, and computing resource profiles.

User profiles contain pertinent information about individual users, such as a user identifier/name, password, default group, and other relevant details. A user profile may consist of a base segment containing common information, along with optional segments that provide subsystem-specific details related to specific subsystems within the Z/OS operating system of source system 114. These subsystems may include, for example, Time Sharing Option/Extensions (TSO/E), Customer Information Control System (CICS), or other subsystems within the Z/OS operating system.

Group profiles, on the other hand, comprise collections of user and group profiles. A group profile encompasses users or groups that share similar access requirements to resources within source system 114. Group profiles allow for hierarchical aggregation of more specific subgroups, adhering to the security management principle of avoiding repetition.

Dataset profiles play a crucial role in protecting access to specific files (discrete profiles) or groups of files (generic profiles) based on their naming conventions. These profiles enable controlled access to the resources within source system 114.

Additionally, computing resource profiles serve to protect general resources within source system 114. These resources can include a wide range of components, such as CICS resources, temporary storage queues, transient data queues, transactions, programs, files, database resources, hierarchical database resources, transaction processing system resources, job entry system resources, direct access storage device resources, tape volume resources, terminal resources, and other computing or Z/OS operating system resources within source system 114.

In accordance with some embodiments, the process of migrating a source application (e.g., a mainframe application) from source system 114 to a "target" cloud-based application in provider network 100 involves a series of steps, with potential assistance from application modernization service 104. The migration process typically commences with an assessment of the source application, which entails understanding its functionalities, dependencies, data structures, and integration points. Furthermore, the objectives and goals of the migration, such as scalability improvement, cost reduction, or enhanced flexibility, are identified.

As a result of this assessment and planning phase, a comprehensive migration plan is formulated. This plan outlines the necessary steps, anticipated timeline, and resource requirements for a successful migration.

Another step in the migration process involves analyzing the source application to identify the necessary changes required for its migration to provider network 100. This analysis entails assessing the source application's architecture and determining areas that need to be refactored. This may involve separating the business logic from platform-specific code and identifying components of the source application that can be replaced with cloud-native alternatives.

The objective of application refactoring is to transform the application into a modular, scalable, and independent solution that is free from mainframe-specific dependencies. By undertaking this step, the application becomes better suited for migration to provider network 100, allowing for enhanced flexibility and efficient utilization of cloud-based resources.

Another step in the migration process involves developing a strategy for migrating data from source system 114 to provider network 100. This strategy encompasses several aspects, including identifying the data sources within the source system, mapping data structures to formats compatible with the cloud environment, and determining the most efficient mechanisms for data transfer.

During this step, factors such as data volume, data integrity, security considerations, and compliance requirements are taken into account. The objective is to ensure a smooth and reliable migration of data, while maintaining data integrity and adhering to necessary security and compliance protocols. By carefully planning and executing the data migration strategy, organizations can effectively transition their data from the source system to provider network 100, enabling seamless operation within the cloud environment.

Another step in the migration process involves selecting the most suitable approach for migrating the source application to provider network 100. Two common migration options are re-platforming and re-factoring.

In a re-platforming approach, the source application is migrated to provider network 100 with minimal or no modifications. This option focuses on transferring the application as it is, making necessary adjustments to ensure compatibility within the cloud environment.

On the other hand, the re-factoring approach involves redesigning and rewriting the source application using cloud-native technologies and frameworks. This option allows for the optimization of the application to fully leverage the benefits of the cloud environment.

The selection of the migration approach depends on various factors, including the complexity of the source application, long-term goals of the migration, and the available resources. Each implementation may require a different approach, tailored to meet the specific requirements and objectives of the migration process.

Another step in the migration process involves ensuring the seamless integration of the migrated application with the services provided by provider network 100. This phase focuses on integration and testing activities to validate the functionality, performance, and security of the target application within the new environment.

During this step, thorough testing is conducted to verify that the migrated application functions as intended and meets the required performance standards. Additionally, security measures are assessed to ensure that the application operates securely within provider network 100.

By conducting comprehensive integration and testing, organizations can identify and resolve any potential issues or discrepancies, ensuring a smooth and successful transition of the application into the cloud environment.

Another step in the migration process involves deploying the target application to provider network 100 once the testing phase is complete. During this step, the application is made available and accessible within the cloud environment.

Furthermore, it can be important to monitor and optimize the target application's performance, scalability, and cost-efficiency in the cloud environment. This can be achieved by utilizing cloud-native tools and services specifically designed for auto-scaling, load balancing, and efficient resource utilization. By leveraging these capabilities, organizations can ensure that the application operates optimally, adapts to changing demands, and maximizes resource efficiency, resulting in an enhanced user experience and cost optimization.

Continuous monitoring and optimization of the target application allow organizations to maintain optimal performance levels, scale resources as needed, and make cost-effective decisions to optimize the utilization of cloud resources within provider network 100.

Another step in the migration process involves providing training and support to users and administrators of the target application to ensure their familiarity and proficiency with the new cloud-based application. This training and support phase is crucial for a smooth transition and successful adoption of the target application within provider network 100.

During this step, comprehensive documentation is offered to users and administrators, providing them with the necessary information and guidance on how to effectively utilize the target application. Additionally, training sessions may be conducted to impart specific knowledge and skills required to operate the application in the cloud environment.

Ongoing support is also provided to address any queries, issues, or challenges that may arise during the transition and subsequent usage of the target application. This support ensures that users and administrators have the necessary assistance to overcome any obstacles and fully benefit from the capabilities and features of the new application.

By offering training and support, both to users and administrators familiar with the source application on source system 114 and new users and administrators of the target application in provider network 100, organizations can facilitate a smooth transition, promote user adoption, and optimize the overall efficiency of the cloud-based application.

In some embodiments, provider network 100 adopts a shared security model with its customers. This shared security model entails provider network 100 being responsible for the security "of" the cloud infrastructure, while customers are responsible for the security "in" the cloud.

Specifically, provider network 100 ensures the security of shared computing resources, data storage, databases, and networking resources that are utilized by customers. This includes measures such as tenant isolation to maintain separation between different customer environments.

On the other hand, customers are responsible for securing their own customer-specific data, platforms, applications, operating systems, networks, firewalls, and other resources provisioned within provider network 100. They can utilize the identity and access management service 102 to implement appropriate security measures to safeguard their data and resources.

By adopting this shared security model, provider network 100 and customers collaborate to create a secure cloud environment. Provider network 100 focuses on the overall security and integrity of the infrastructure, while customers have the responsibility to implement security measures tailored to their specific requirements within the cloud environment.

When migrating the source application from source system 114 to provider network 100, one challenge associated with the shared security model arises in transferring the access controls from source system 114 (such as ESM profiles and access control semantics) to equivalent access controls that can be used by the identity and access management service 102 in provider network 100 to enforce the same permissions for the target application.

The source application in source system 114 may rely on specialized or proprietary resources and specific security rules, such as those implemented by the ESM system, to govern access. Database 116 may contain a substantial number of security definitions, potentially reaching hundreds of thousands.

Due to the scale and complexity involved, manual translation of the source access controls to target access controls is not feasible or practical. Therefore, an automated process for transposing the source access controls to their target equivalents becomes essential. This automated approach ensures the efficient and accurate conversion of access controls, preserving the same level of permissions and security requirements for the target application within provider network 100.

To facilitate the migration of source access controls from database 116, which are utilized by source system 114, to their equivalent target access controls employed by identity and access management service 102 for controlling access to customer resources in provider network 100, the application modernization service 104 incorporates two components: the access control verifier 122 and the access control translator 124.

The access control translator 124 is responsible for automatically converting the source access controls into the corresponding target access controls. This process ensures a seamless transition of access control mechanisms between source system 114 and provider network 100.

The access control verifier 122 automatically validates the relationship between the access permissions allowed by the source access controls and those granted by the target access controls generated by the access control translator 124. This verification process examines the access permissions and identifies the nature of the relationship between the two sets of controls.

The relationship between the access controls can fall into one of four categories: (1) more permissive, indicating that the target access controls allow access beyond what is permitted by the source access controls; (2) less permissive, suggesting that the source access controls allow access that is not granted by the target access controls; (3) equivalent, signifying that both the source and target access controls permit the same level of access; or (4) disjoint, indicating that there is no overlap between the access permissions allowed by the source and target access controls.

By incorporating these components, the application modernization service 104 ensures the accurate translation and verification of access controls, enabling a smooth and secure migration process for the customer's resources in provider network 100.

FIG. 1 provides an illustration of a method aimed at migrating the source access controls stored in database 116 and employed by source system 114 to regulate access to its resources, to the target access controls utilized by identity and access management service 102 for controlling access to resources within provider network 100. The method, depicted in FIG. 1 using numbered circles superimposed on directed arrows, is designed to represent the data flow direction, without indicating an exclusive direction. The numbers within the circles overlaid on the directed arrows serve as labels for the steps of the method and do not necessarily imply a specific order of the steps, unless clearly indicated within the context.

While in some embodiments the method is performed to effectuate a bulk or batch migration of source access controls to verified target access controls, the method is performed to effectuate an incremental migration of updated or new source access control in database 116 to verified target access controls utilized by identity and access management service 102 in provider network 100. For example, the customer may wish to simultaneously operate both the application on source system 114 and the migrated application in provider network 100 for a period of time. For example, this simultaneous configuration may be used until the customer has successfully migrated users from using the application on source system 114 to using the migrated application in provider network 100, which may take some time for organization or training reasons. During this period of simultaneous operating, new source access controls may be added to database 116 or already migrated source access controls may be updated in database 116. In this case, the method may be performed again to migrate the new or updated source access controls in database 116 to verified target access controls in provider network 100. Overall, the method may be performed once or performed on a periodic or incremental basis to migrate some or all source access controls in database 116 and employed by source system 114 to regulate access to its resources, to the target access controls utilized by identity and access management service 102 for controlling access to resources within provider network 100.

The extractor process 118, situated in customer network 112, possesses access to source system 114. This process 118 captures a snapshot of database 116, which is typically in a tabular and text data format. The captured snapshot includes a report header, offering general information about the report itself, such as its name, date, time, and potentially other relevant identification or configuration details. Within the captured snapshot, several columns hold diverse pieces of information about the source access controls in the rows. The specific columns and their order may vary depending on the version of the Z/OS operating system and the configuration of source system 114. For instance, the columns may encompass any or all the following: Resource name column: This column contains the name of the resource, such as a dataset, program, or system object, for which the source access controls are defined. Resource class column: This column indicates the class or type of the resource, specifying whether it is a dataset, program, or system object. User ID columns: These columns store the user ID or user name associated with the source access control entry, representing the user or group for which the source access controls are defined. Access permissions column: This column details the specific access permissions (e.g., read, write, execute, control, etc.) granted to the user or group for the corresponding resource. Any other suitable columns: Additional columns may be present, depending on the configuration of source system 114 or the requested information. Examples include a group ID column, an owner column, a data set type column, and more.

In certain embodiments, to capture the snapshot of the source access controls in source system 114, the extractor process 118 utilizes the Z/OS IRRDBU00 utility. This utility, known as the Integrated Catalog Facility (ICF) Rapid Database Utility, is commonly used for managing and manipulating Z/OS catalog data sets stored in database 116. These catalog data sets contain information about various resources of source system 114, such as data sets, programs, and other system objects.

To capture the snapshot, extractor process 118 programmatically and automatically logs into source system 114 using appropriate credentials. It then initiates a terminal, console session, or another suitable process on source system 114 to capture the snapshot. For instance, extractor process 118 may provide input (e.g., terminal, console, or command line input) to source system 114 that triggers the execution of the IRRDBU00 utility. Once the IRRDBU00 program is launched, extractor process 118 may supply input to execute the "LISTRACF" command. This command, within the IRRDBU00 utility of Z/OS, retrieves the snapshot of the source access controls currently defined in database 116. The output of the LISTRACF command, which contains the snapshot, can be captured by extractor process 118 from the terminal or console.

At step 1 of the method, the extractor process 118 saves the captured snapshot to a file or transmits it via network 110 to provider network 100. Simultaneously, at step 1, the data streaming service 108 receives the captured snapshot of the source access controls sent by extractor process 118. It is important to note that data streaming service 108 and provider network 100 generally support multiple customers concurrently, as they migrate their mainframe applications to provider network 100.

Customer network 112, comprising source system 114, database 116, and extractor 118, represents just one example of the numerous customer networks and source systems that may be in the process of migrating their mainframe systems to provider network 100. In order to accommodate this, data streaming service 108 can be configured with a specific topic or channel for each customer or mainframe system, or at any other suitable granularity. Thus, upon receiving the captured snapshot at step 1, data streaming service 108 publishes it to the corresponding topic or channel (e.g., the topic or channel associated with the relevant customer or source system 114).

At step 2 of the method, a serverless function executed by serverless code execution service 106 subscribes to the topic or channel of the data streaming service 108 where the captured snapshot is published. The serverless function retrieves the captured snapshot from the topic or channel.

Moving on to step 3, the serverless function then sends or otherwise delivers the captured snapshot to the application modernization service 104.

Within the application modernization service 104, there are two components: access control translator 124 and access control verifier 122. Access control translator 124 is responsible for converting the source access controls from the captured snapshot into target access controls that can be effectively enforced by the identity and access management service 102. The process of how access control translator 124 performs this translation will be discussed in more detail later on. On the other hand, access control verifier 122 validates the equivalence and accuracy of the generated target access controls produced by access control translator 124. The detailed operation of access control verifier 122 in terms of verifying the translation of source access controls to target access controls will also be elaborated upon.

At step 4 of the process, the translated and verified target access controls are transmitted or provided to the identity and access management system 102. The role of the identity and access management system 102 is to utilize these translated and verified target access controls for the purpose of enforcing access to customer resources within provider network 100. These resources may include those that have been migrated from the source system 114 or are built upon the resources of the source system 114. By utilizing the translated and verified target access controls, the identity and access management system 102 ensures that the appropriate permissions and restrictions are applied to these customer resources, thereby maintaining the desired level of security and access control.

Example Application Modernization Service

Figure 2:
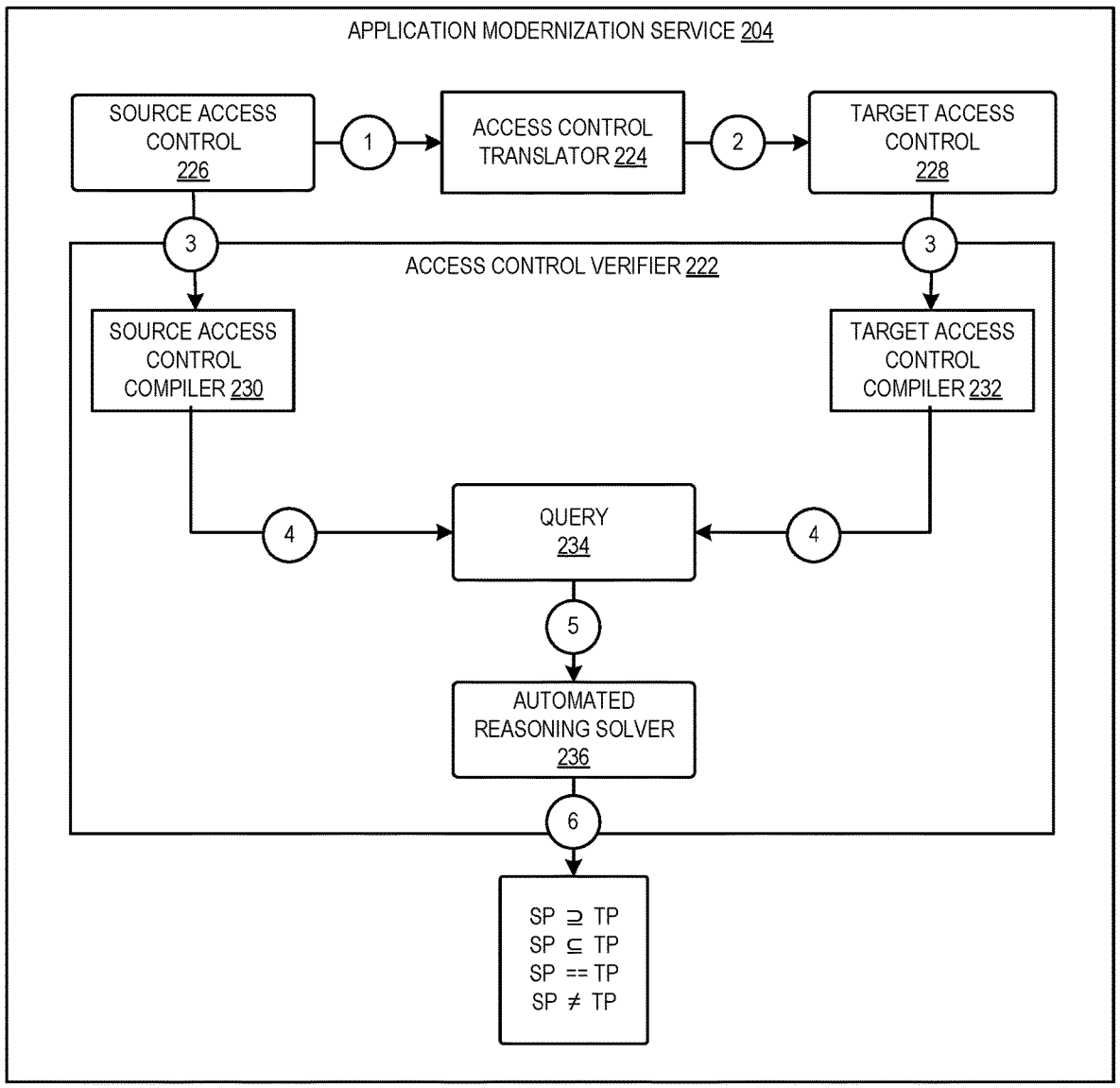
FIG. 2 illustrates an example system and method for verifying translated access controls for application modernization, according to some embodiments.

FIG. 2 provides an illustration of the components and functioning of the application modernization service 204, as described in certain embodiments. The application modernization service 204 in FIG. 2 corresponds to the application migration service 104 depicted in FIG. 1. Within the application modernization service 204, two components are present: the access control translator 224 and the access control verifier 222. These components, namely the access control translator 224 and access control verifier 222, are equivalent to the previously mentioned access control translator 124 and access control verifier 122 from FIG. 1.

At step 1, the access control translator 224 performs its function by taking the source access control 226 as input and generating a corresponding translation represented by the target access control 228. In certain embodiments, the source access control 226 may be enforced by a ESM system, serving to regulate access to resources within a source system (e.g., source system 114). The enforcement conducted by the ESM system encompasses user authentication and user authorization. User authentication involves the ESM system validating a user's identity through the verification of their user ID, password, or other credentials, ensuring that only authorized users are granted access to the source system. User authorization, on the other hand, entails the ESM system determining the specific level of access granted to an authenticated user for particular resources within the source system. This determination is made based on predefined rules and policies outlined in the source access control 226.

The rules and policies within the source access control 226 are commonly defined within security profiles and access control lists (ACLs). A security profile associated with a user contains relevant information about the user, such as their user ID, group membership, and special attributes. This security profile also specifies the default access authority granted to the user. Meanwhile, an ACL within the source access control 226 outlines the access levels assigned to different users or groups for specific resources within the source system. These access levels defined by the ACL govern the ability to read, write, update, or execute a particular resource. The ESM system ensures that access to various resource types, including datasets, programs, system commands, and system utilities, is regulated in accordance with the rules stipulated in the source access control 226. For datasets, the ESM system may control access at different levels, such as the entire dataset or individual fields within the dataset. Similarly, the execution of executable programs may be restricted to authorized users or groups as determined by the source access control 226. Additionally, the ESM system may impose limitations on the execution of specific system commands, permitting their use solely by designated users or groups to prevent unauthorized modifications to the system.

In certain embodiments, the source access control 226 encompasses a ESM General Resource Profile (GRP). The ESM GRP is a specific type of security profile utilized within the ESM for the Z/OS operating system. Its purpose is to define and manage access control rules pertaining to a particular class or type of resource within the source system. By employing a ESM GRP, an administrator can establish access control rules that apply to a group of resources sharing common characteristics or attributes. This approach simplifies the management and administration process.

For instance, a ESM GRP may be employed to protect datasets associated with a specific department (e.g., sales, marketing, engineering) within the customer's environment, programs belonging to a particular application, or system commands. Within a ESM GRP, the customer can specify access control rules that determine the level of access granted to users for resources within the group. These rules define permissions such as READ, WRITE, UPDATE, or EXECUTE. Moreover, a ESM GRP allows the customer to establish conditions and criteria for access control rules. These conditions may be based on user attributes, environmental factors, or specific resource attributes. For example, a ESM GRP might include a rule granting access only during specific time intervals or restricting access to a particular user group.

By associating resources of the source system with an ESM GRP, consistent access control enforcement is achieved throughout the multiple resources within the source system. This ensures that access permissions align with the defined rules and policies set forth in the source access control 226.

In certain embodiments, the source access control 226 includes a ESM dataset profile. A ESM dataset profile is a type of security profile utilized in the ESM system for the Z/OS operating system, specifically designed to manage access control for datasets-logical units of data storage within the Z/OS environment. By employing ESM dataset profiles, access control rules for individual datasets or groups of datasets can be defined and managed, specifying permissions for reading, writing, updating, or deleting the datasets.

The utilization of ESM dataset profiles enables customers to enforce source access controls at the dataset level, ensuring that only authorized users or groups can access and manipulate the data within the datasets. These profiles contain various security attributes that define access permissions and restrictions for the datasets. These attributes may include access levels (e.g., read, write, control), owner information, dataset name patterns, or any other relevant criteria for access control decisions.

With ESM dataset profiles, source access control rules can be established to govern specific actions on the datasets. These rules may be based on the user's identity, group membership, or other attributes defined in their security profiles. Additionally, conditional access rules are supported by ESM dataset profiles, allowing access restrictions to be defined based on specific conditions. For instance, a ESM dataset profile may include a rule granting access only during certain time periods, for particular job steps, or based on the location of the accessing user.

To simplify administration and maintain consistent security policies, ESM dataset profiles can be organized into groups, also known as data class profiles. Data class profiles facilitate the definition of common source access control rules and attributes for groups of datasets with similar characteristics. This organizational structure streamlines administration tasks and ensures the consistency of security policies across datasets within the same data class.

In certain embodiments, the source access control 226 includes an ESM custom profile. An ESM custom profile refers to a user-defined profile that extends the capabilities of the ESM system. An ESM custom profile allows a system administrator of source system 114 to define additional security rules and access controls for specific resources or entities within the mainframe environment. An ESM custom profile created by the system administrator or security personnel to address specific security requirements or customize the access control rules beyond the default configurations provided by the ESM system. An ESM customer profile can be defined for various types of resources, such as datasets, programs, transaction identifiers, or system commands. They enable administrators to set fine-grained access permissions, define specific attributes or restrictions, and establish unique security policies tailored to the needs of the organization. By leveraging ESM custom profiles, organizations can have more granular control over access to their mainframe resources, allowing them to enforce specific security policies, meet compliance requirements, and protect sensitive data effectively.

In certain embodiments, the target access control 228 encompasses an access control policy. This policy defines the permissible and prohibited actions on resources within provider network 100. It is used to manage access to services and resources for individual users, groups, or roles within a user or customer account in provider network 100. The access control policy specifies the actions that users or roles can perform on resources, such as creating, deleting, or modifying resources. Each action is associated with a specific service or resource type according to the access control policy. Additionally, the access control policy can define permissions at the resource level. For example, it may specify that a user in provider network 100 has access to a specific data storage resource or a particular virtual machine instance within the network.

The access control policy is typically formatted in a specific data interchange format, such as JavaScript Object Notation (JSON) or similar formats, and consists of a set of statements. Each statement includes an effect (allow or deny), a set of one or more actions, a set of one or more resources, and optional conditions. Identity and access management service 102 attaches the access control policy to users, groups, roles, or resources. When a user or role is authenticated and authorized, the identity and access management service 102 evaluates the access control policy to determine the permissions granted to that entity.

In the evaluation process, identity and access management service 102 follows an explicit deny model. If an applicable access control policy explicitly denies a particular action on a specific resource for a user, that denial takes precedence over any allowances granted to the user in the same or other access control policies. Furthermore, the identity and access management service 102 adheres to the principle of least privilege. If no access control policy permits the user to perform a certain action on a resource, the user is automatically denied access to that resource. These principles ensure that access control is enforced based on explicit permissions and the concept of granting only the necessary privileges.

In certain embodiments, a statement in the access control policy of the target access control 228 is a component that defines a specific set of permissions for one or more resources within provider network 100. This statement specifies the allowed or denied actions, the resources to which the actions apply, and optional conditions. A statement typically consists of an effect, one or more actions, one or more resources, and one or more optional conditions.

The effect of a statement can be either "allow" or "deny," determining whether the specified actions are permitted or prohibited for the associated resources. The actions specify the permitted or denied actions of one or more services within provider network 100. For instance, an action might be defined as "DSS:PUTOBJECT," where "DSS" represents a data storage service in provider network 100 and "PUTOBJECT" refers to an API call within the service to store a data object in a data storage container such as a folder or bucket.

Wildcards can be used in actions to cover multiple API operations. For example, "DSS:" represents all API actions within the data storage service, while "DSS: PUT" represents all "PUT" API actions within the service.

The resources defined in a statement specify the resource or set of resources within provider network 100 to which the actions of the statement apply based on the effect. Resources can be specified using uniform resource indicators (URIs) or wildcards to represent multiple resources.

Conditions within a statement provide additional criteria that must be met for the statement to apply. Conditions enable more granular control over when the statement takes effect. For instance, conditions may be based on factors such as time, network attributes, or other request attributes when performing an action on a resource.

In certain embodiments, the target access control 228 consists of multiple access control policy statements. In such cases, identity and access management service 102 evaluates each statement individually, and the overall effect of the policy (allow or deny) is determined by combining the effects of the statements.

The policy's effect is to allow a request only if there is no applicable statement in the policy with a "deny" effect and at least one applicable statement with an "allow" effect. If none of the statements in the policy apply to the request (e.g., due to unmet conditions), then the policy has no effect on the request. In this case, unless another policy explicitly allows the request and there is no conflicting policy that denies the request, the identity and access management service 102 will deny the request.

In summary, the evaluation of the access control policy involves considering each statement's effect individually and determining the policy's overall effect based on the combination of the statements. If no applicable statements allow the request and there are no conflicting statements denying the request, the request will be denied by the identity and access management service 102.

In step 2 of FIG. 2, access control translator 224 performs the translation of source access control 226 to target access control 228 using various approaches. One method used by translator 224 is to identify the resources covered by a ESM GRP or a ESM dataset profile. Translator 224 determines the types or classes of the covered resources, such as datasets, programs, or system commands. It also identifies the specific access permissions (e.g., read, write, execute, control) granted or denied in the ESM GRP or dataset profile for these resources.

Based on this information, access control translator 224 maps the ESM GRP or dataset profile to one or more access control policy statements within the target access control policy 228. The policy statements in target access control 228 are defined with "allow" or "deny" effects, depending on the specific access permissions from the ESM GRP or dataset profile.

Furthermore, access control translator 224 sets the action element of a policy statement in target access control 228 to the corresponding provider network 100 service action or API operation that aligns with the access permission of the ESM GRP or dataset profile. The resource element in a policy statement of target access control 228 is specified to match the provider network 100 resource associated with a resource covered by the ESM GRP or dataset profile access permission. Additionally, translator 224 specifies a condition element in a policy statement of target access control 228 to correspond with the condition of a ESM GRP or dataset profile access permission.

If the ESM profile contains multiple access control rules, translator 224 repeats the translation operations for each rule. The resulting policy statements are then combined into target access control 228, forming a policy document that represents the overall access control defined in the ESM GRP or dataset profile. Target access control 228, generated by translator 224, is formatted in a data interchange format, such as JSON, allowing it to be processed by identity and access management service 102.

Before target access control 228 is attached to an entity in provider network 100 by identity and access management service 102 to safeguard resource access, the translation performed by access control translator 224 from source access control 226 to target access control 228 can be verified by access control verifier 222. At step 3, source access control 226 and target access control 228 are input into access control verifier 222.

At step 4, source access control compiler 230 within verifier 222 compiles source access control 226 into a logical formula (encoding) that can be solved by an automated reasoning solver 236 such as, for example, a Satisfiability Modulo Theories (SMT) solver. Similarly, at step 4, target access control compiler 232 compiles target access control 228 into a logical formula (encoding) that is solvable by automated reasoning solver 236. These encodings are utilized in query 234, which is submitted to automated reasoning solver 236 in step 5.

Automated reasoning solver 236 is a computer system that implements one or more techniques and algorithms to automatically reason about logical statements, mathematical proofs, or assertions. Automated reasoning solver 216 may implement various algorithms such as theorem providing, model checking, and Satisfiability Modulo Theories (SMT) solving. Automated reasoning solver 216 may be able to handle different types of logical systems and may be used in diverse areas of formal verification, artificial intelligence, and software analysis. Automated reasoning solver 236 may encompass an automated theorem that is primarily configured for proving mathematical theorems. The automated theorem prover may be a specialized tool designed to automatically find formal proofs for mathematical statements using logical deduction, inference rules, and axioms. The automated theorem provers may be tailored to a mathematical domain and may employ specific proof strategies, such as resolution-based methods, tableau methods, or Satisfiability Modulo Theories (SMT) methods.

Query 234 prompts automated reasoning solver 236 to determine, based on the compiled logical formula encodings of source access control 226 and target access control 228, whether there are any requests allowed by target access control 228 that are not allowed by source access control 226. If such a case exists, it indicates that translator 224 has generated a translation of source access control 226 that is more permissive than the original access control, potentially posing a security risk. This situation could allow users who were previously unable to access certain resources (e.g., confidential data) in source system 114 to gain access to the corresponding resources in provider network 100.

Furthermore, query 234 may also ask automated reasoning solver 236 to determine, based on the compiled logical formula encodings, whether there are any requests allowed by source access control 226 that are not allowed by target access control 228. This scenario may indicate an availability issue if target access control 228 is employed to protect a resource in provider network 100. In such a case, users who were able to access a resource in source system 114 would no longer have access to the corresponding resource in provider network 100.

Overall, the verification process conducted by access control verifier 222 ensures the correctness and consistency of the translated target access control 228 in comparison to the source access control 226.

Example Verification

Figure 3:
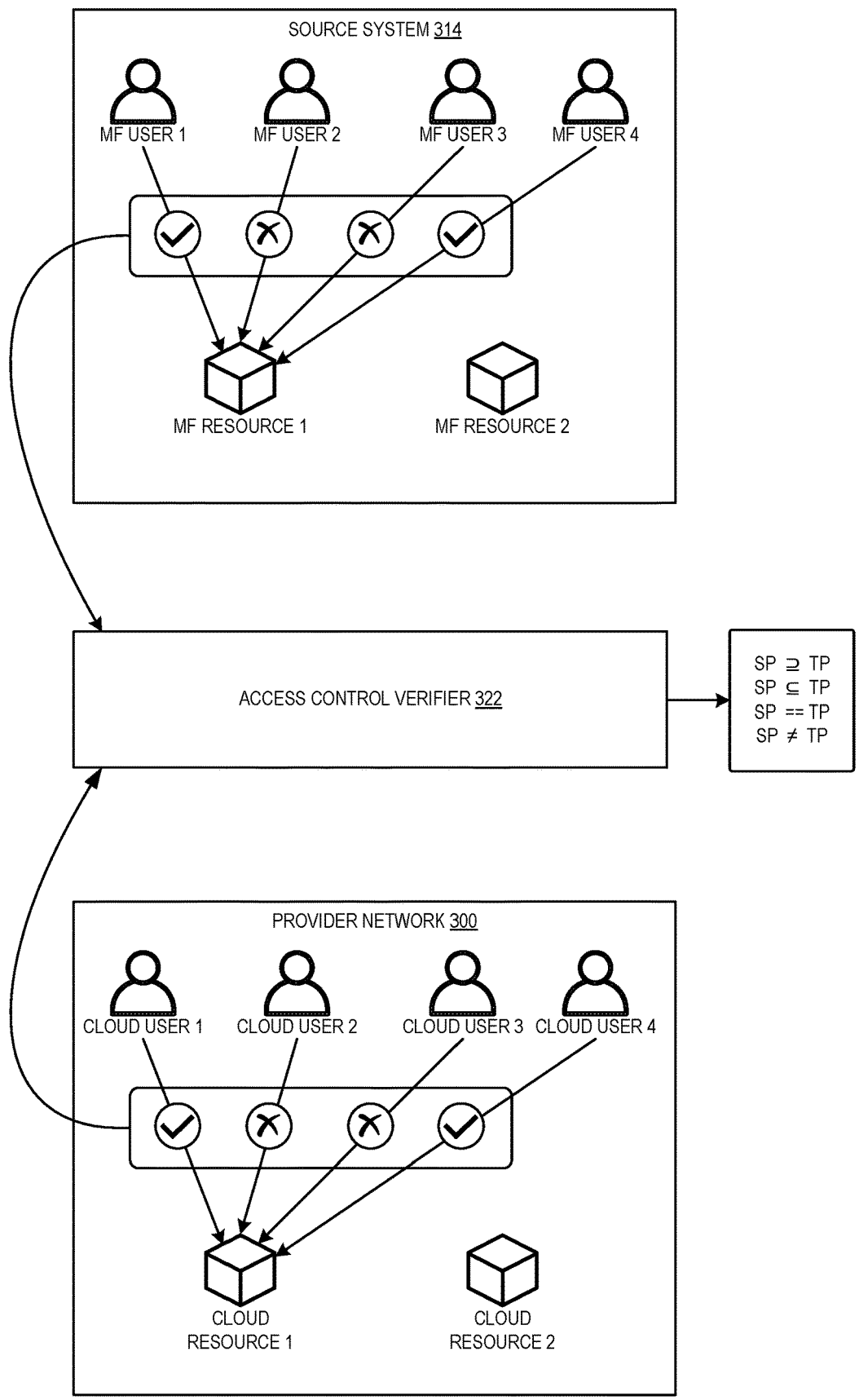
FIG. 3 illustrates an example of the verification task performed by an access control verifier of an application modernization service, according to some embodiments.

FIG. 3 provides an example of the verification task conducted by access control verifier 322, which corresponds to access control verifier 222 of FIG. 1 and access control verifier 122 of FIG. 1. In this scenario, Source System 314 (corresponding to Source System 114 of FIG. 1) includes a resource called MF RESOURCE 1 that is protected by source access controls. As depicted in the figure, the source access controls permit MF USER 1 and MF USER 4 to access MF RESOURCE 1, while denying access to MF USER 2 and MF USER 3.

On the other hand, Provider Network 300 (corresponding to Provider Network 100 of FIG. 1) involves the migration of MF RESOURCE 1 to a resource in Provider Network 100 known as CLOUD RESOURCE 1. Furthermore, the migration also encompasses the transfer of MF USER 1, MF USER 2, MF USER 3, and MF USER 4 to cloud users in Provider Network 300, namely CLOUD USER 1, CLOUD USER 2, CLOUD USER 3, and CLOUD USER 4, respectively.

The task of verifier 322 is to determine whether the target access controls implemented in Provider Network 300 to regulate access to CLOUD RESOURCE 1, which are derived from the source access controls of Source System 314, are more permissive, more restrictive, equivalent, or disjoint in comparison to the source access controls.

In the example illustrated in FIG. 3, the access controls are verified by verifier 332 to be equivalent. This means that CLOUD USER 1 and CLOUD USER 2 in Provider Network 100, corresponding to MF USER 1 and MF USER 4 in Source System 314, are allowed access to CLOUD RESOURCE 1 according to the target access control. However, CLOUD USER 2 and CLOUD USER 3 in Provider Network 100, corresponding to MF USER 2 and MF USER 3 in Source System 314, are not granted access to CLOUD RESOURCE 1 based on the target access control.

Source access control compiler 230 and target access control compiler 232 are responsible for generating automated reasoning (e.g., SMT) encodings for source access control 226 and target access control 228, respectively. The process of encoding performed by compilers 230 and 232 involves translating source access control 226 and target access control 228 into a logical formula that can be solved by automated reasoning solver 236. Automated reasoning solver 236 is an automated software tool used in various areas, including formal verification and program analysis, to determine the satisfiability of logical formulas (encodings) that incorporate different theories such as arithmetic, bit-vectors, arrays, and more.

During the encoding process carried out by compilers 230 and 232, the constraints and requirements of source access control 226 and target access control 228 are mapped into a logical representation that captures their semantics. This representation includes variables, quantifiers, logical operators, and function symbols specific to the theories being utilized. The encoding adheres to the syntax and semantics of the input expected by automated reasoning solver 236, which may involve using a standardized language like SMT-LIB or a solver-specific language.

In some embodiments, the evaluation of source access control 226 against an access authorization request received by the ESM system of source system 114 involves a series of authorization steps. The total number of authorization steps may be thirty-one, for example; however, not all steps are necessarily evaluated for every access authorization request received by source system 114. The outcome of the evaluation can fall into one of four determinations: (1) the resource is not protected by the ESM system, (2) the requested access is allowed (output value 0), (3) the requested access is allowed with a warning (output value 4), or (4) the requested access is denied (output value 8).

The evaluation process begins with the first step, which determines whether source access control 226 encompasses a the ESM GRP and, if so, whether the class/type of the resource protected by the ESM GRP is active. If the class/type is not active, it means that the resource is not protected by the ESM system, and thus the ESM system may allow the access request. If the class/type is active, the evaluation proceeds to the remaining steps.

For each subsequent step that is evaluated for the access request, the condition of the step is assessed based on source access control 226. Depending on the evaluation of the step's condition, one of the following actions is taken: (1) the evaluation proceeds to the next step, (2) the request is denied, and the evaluation process stops, or (3) the request is allowed, and the evaluation process stops.

In some embodiments, source access control compiler 230 is responsible for generating automated reasoning (e.g., SMT) formulas for the ESM system authorization steps. Compiler 230 utilizes a formalized version of the ESM system authorization steps, which are expressed as automated reasoning (e.g., SMT) equations and instantiated based on the source access control 236 being compiled.

Example External Security Manager Authorization Process

Figure 4:
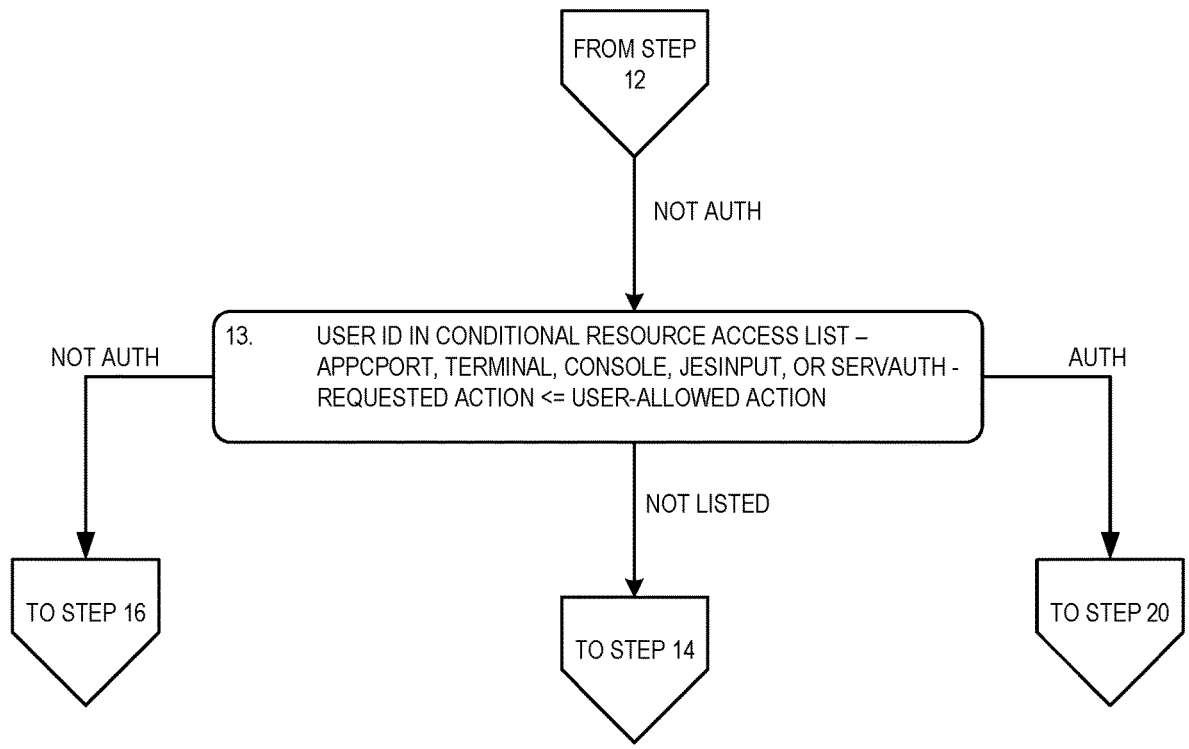
FIG. 4 illustrates a step of a source access control process for evaluation of an access authorization request, according to some embodiments.

For instance, FIG. 4 depicts step 13 of the ESM system evaluation for an access authorization request. Step 13 is reached when the request is subject to the access control of the ESM system and has not been allowed or denied by previous evaluation steps. In step 13, if the user ID of the request is not included in the conditional resource access list with APPCPORT, TERMINAL, CONSOLE, JESINPUT, or SERVAUTH, the evaluation proceeds to step 14. If authorization is granted at step 13, the evaluation continues to step 20. Otherwise, the evaluation proceeds to step 16.

The example below demonstrates automated reasoning formulas generated by source access control compiler 230 for an instance of source access control 236 and step 13 of the ESM system authorization steps. These automated reasoning formulas are defined for three scenarios: when step 13 is allowed (leading to step 20), when step 13 is denied (leading to step 16), or when step 13 is skipped (leading to step 14).

In this example, ESM system authorization step 13 utilizes the conditional resource access list. As a result, specific usernames from source access control 236, along with corresponding conditions and actions, are incorporated into the automated reasoning formulas. The values of allow, deny, and neutral are assigned as true or false based on the automated reasoning equations.

00: authorization is allowed at step 13
01: (declare-const Step13.allow Bool)
02: (assert (=Step13.allow (and (or (and (=|principalTag/username| "USER9" (or (and (or (="execute" actionName) (="read" actionName)) (="01" |requesttag/terminal|) |requesttag/terminal_exists|) (and (or (="execute" actionName) (="read" actionName) (="update" actionName) (="control" actionName)) (="DDD" |requesttag/servauth|) |requesttag/servauth_exists|)))) Step13Listed)))
03: user is not listed in conditional resource access list with APPCPORT, TERMINAL, CONSOLE, JESINPUT, or SERVAUTH
04: (declare-const Step13.neutral Bool)
05: (assert (=Step13.neutral (not Step13Listed)))
06: authorization is denied at step 13
07: (declare-const Step13.deny Book)
08: (assert (=Step13.deny (and (not (or (and (=|principalTag/username|"USER9" (or (and (or (="execute" actionName) (="read" actionName)) (="01" |requesttag/terminal|) |requesttag/terminal_exists|) (and (or (="execute" actionName) (="read" actionName) (="update" actionName) (="control" actionName)) (="DDD" |requesttag/servauth|) |requesttag/servauth_exists|)))) Step13Listed)))

Example Access Control Translations

Figure 5:
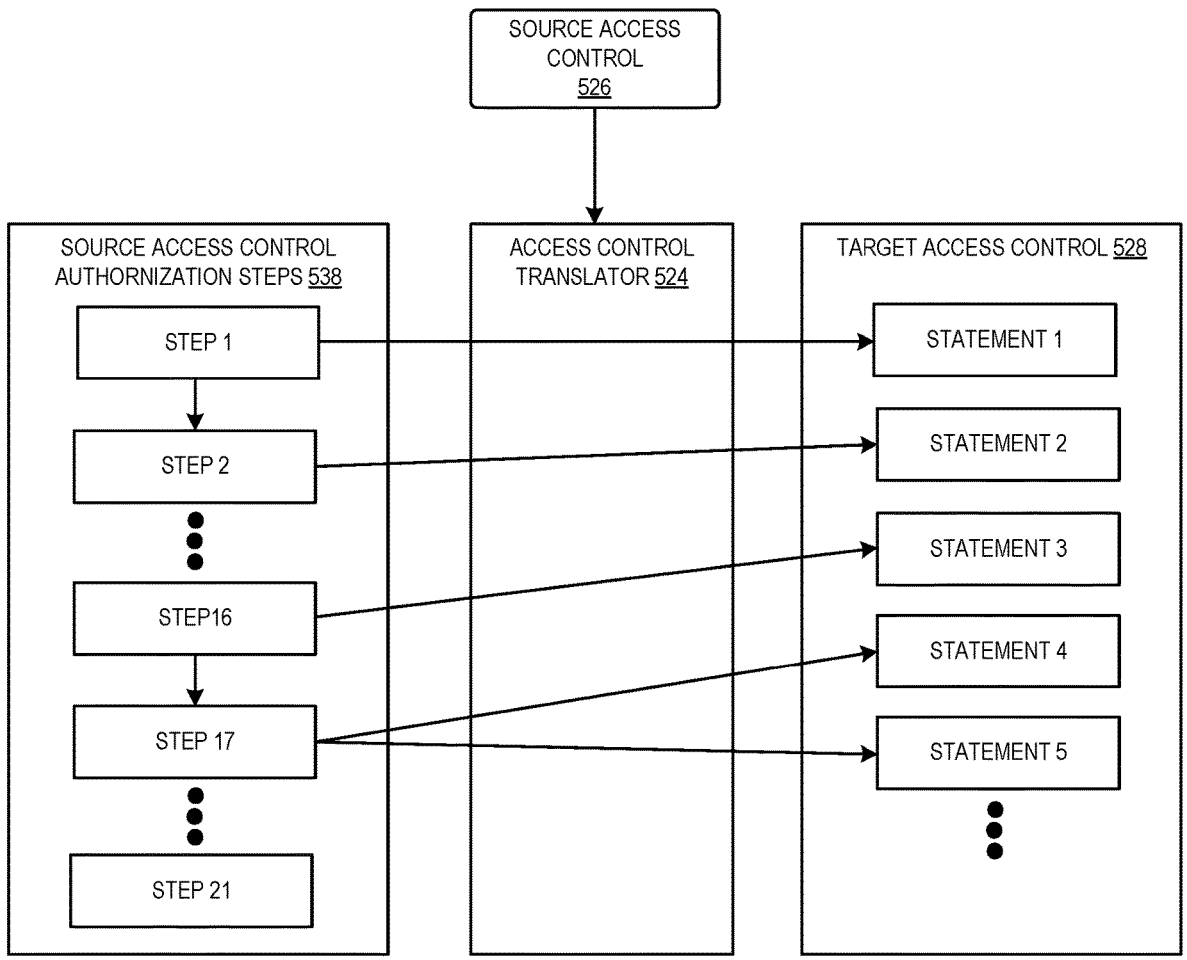
FIG. 5 illustrates an example of a translation of a source access control by an access control translator to a target access control, according to some embodiments.

FIG. 5 illustrates the translation of source access control 526 by access control translator 524 to target access control 528. Source access control 526 corresponds to source access control 226 of FIG. 2, while target access control 528 corresponds to target access control 228 of FIG. 2. Access control translator 524 can be identified as either access control translator 224 of FIG. 2 or access control translator 124 of FIG. 1.

Source access control authorization steps 538 represent the ESM system authorization steps used by source system 114 to evaluate source access control 526 in the context of an access authorization request. In this example, twenty-one out of the thirty-one ESM system authorization steps are considered relevant (effective) for evaluating source access control 526.

Translator 524 encompasses rules for generating corresponding allow or deny policy statements to be included in target access control 528, based on source access control 526 and the effective source access control authorization steps 538. The rules of translator 524 may be conditionally applied, depending on the configurations and options for the ESM profile of source access control 526. As a result, translator 524 might not generate any policy statement in target access control 528 for certain effective source access control authorization steps 538, while it might generate multiple policy statements in target access control 528 for other effective source access control authorization steps 538.

Figure 6:
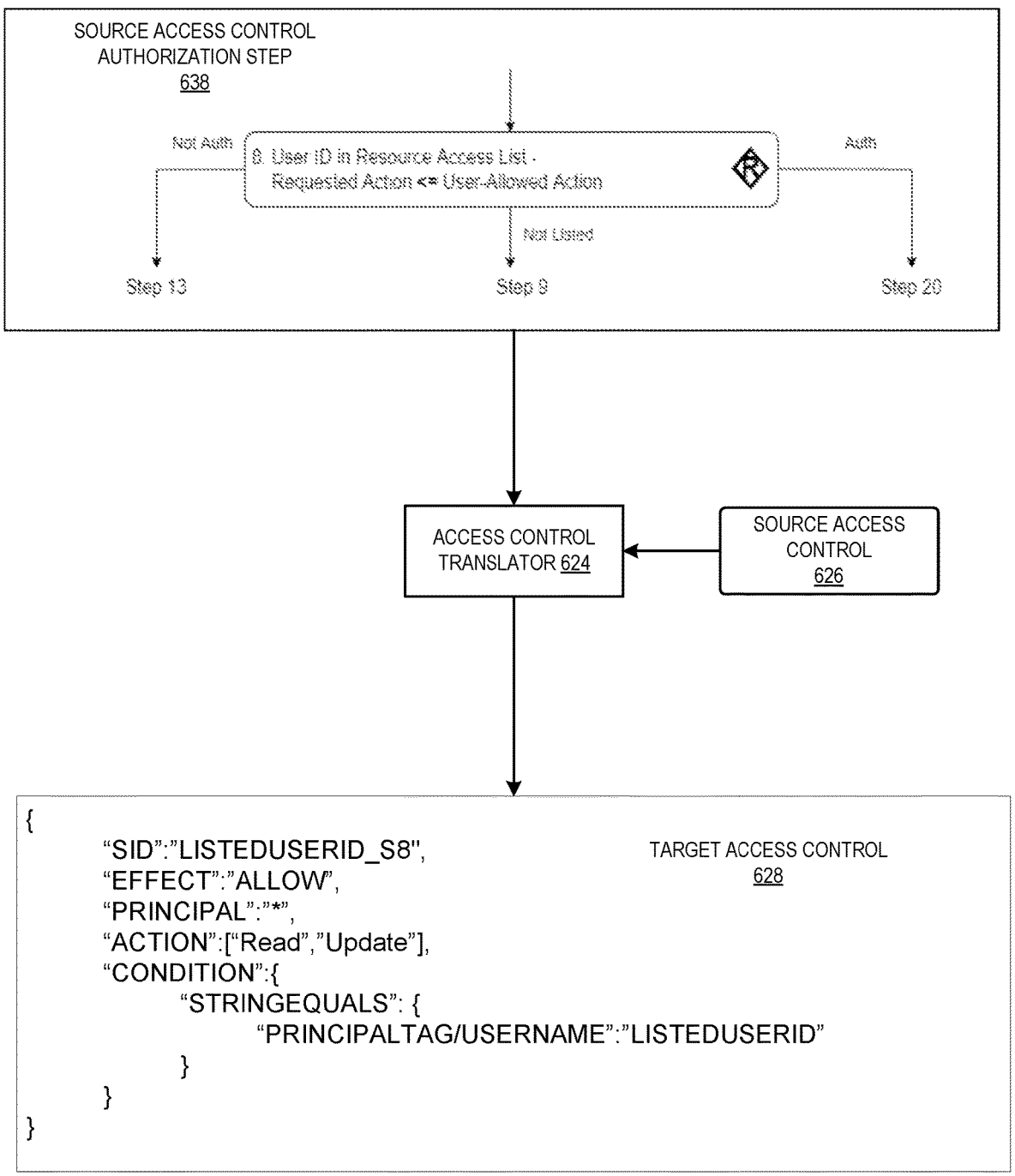
FIG. 6 illustrates an example of an access control translator translating a source access control to a target access control for a source access control authorization step, according to some embodiments.

FIG. 6 illustrates an example of access control translator 624 translating source access control 626 to target access control 628 specifically for source access control authorization step 638. In this example, source access control authorization step 638 corresponds to ESM authorization step 17, which utilizes user ID and a resource access list to determine whether the request should be authorized, not authorized, or skipped.

Translator 624 generates a statement in target access control 628 for each user ID present in source access control 626. To reference the value of the user ID for each user element in the resource access list, translator 624 uses a condition key named "principalTag/username." It maintains the user ID obtained from the ESM system as a principal tag within target access control 628.

As mentioned, a target access control policy can consist of multiple statements, with each statement specifying permissions to be allowed or denied. These statements define permissions based on various components, including the effect, principal, action, resource, and option conditions. For instance, consider the following example of an access control policy that includes a single statement. This statement allows requests from the account "123456789012" to perform "List" actions on a resource named "my-folder," provided that the source network address of the request falls within the specified network address range.

00: {"VERSION": "2023 Oct. 17",
01: "STATEMENT": [
02: {
03: "EFFECT": "ALLOW",
04: "PRINCIPAL": "123456789012",
05: "ACTION": "LIST",
06: "RESOURCE": "MY-FOLDER",
07: "CONDITION": {
08: "SOURCEIPADDRESS": "192.0.2.0/12"
09:}
10:}
11:]
12:}

Returning now to the example of target access control 628, it allows requests for read and update actions when the value of "principalTag/username" in the request context is set to "ListedUserID." This aligns with the definition in source access control authorization step 638, which specifies a resource access list based on users. Therefore, target access control 628 maintains the same authorization determination by allowing specific actions for the designated user.

In the example of target access control 628, the key "principalTag/username" is utilized in a condition to refer to usernames. Referring back to FIG. 2, access control translator 224 can generate target access control 228 using other keys to migrate ESM system information from source access control 226. These keys may include, but are not limited to, the following: "principalTag/username" for usernames, "principalTag/gp1" for groups, "principalTag/Atts" for attributes, "principalTag/userSecLevel" and "resourceTag/ReSecLevel" for security levels, and "resourceTag/Catdnsfailures" and "resourceTag/protectAllFailures" for additional options. The specific key names employed may vary depending on the implementation requirements of a given system. In certain embodiments, these key names are employed in the automated reasoning (e.g., SMT) encoding of source access control 226.

Figure 7:
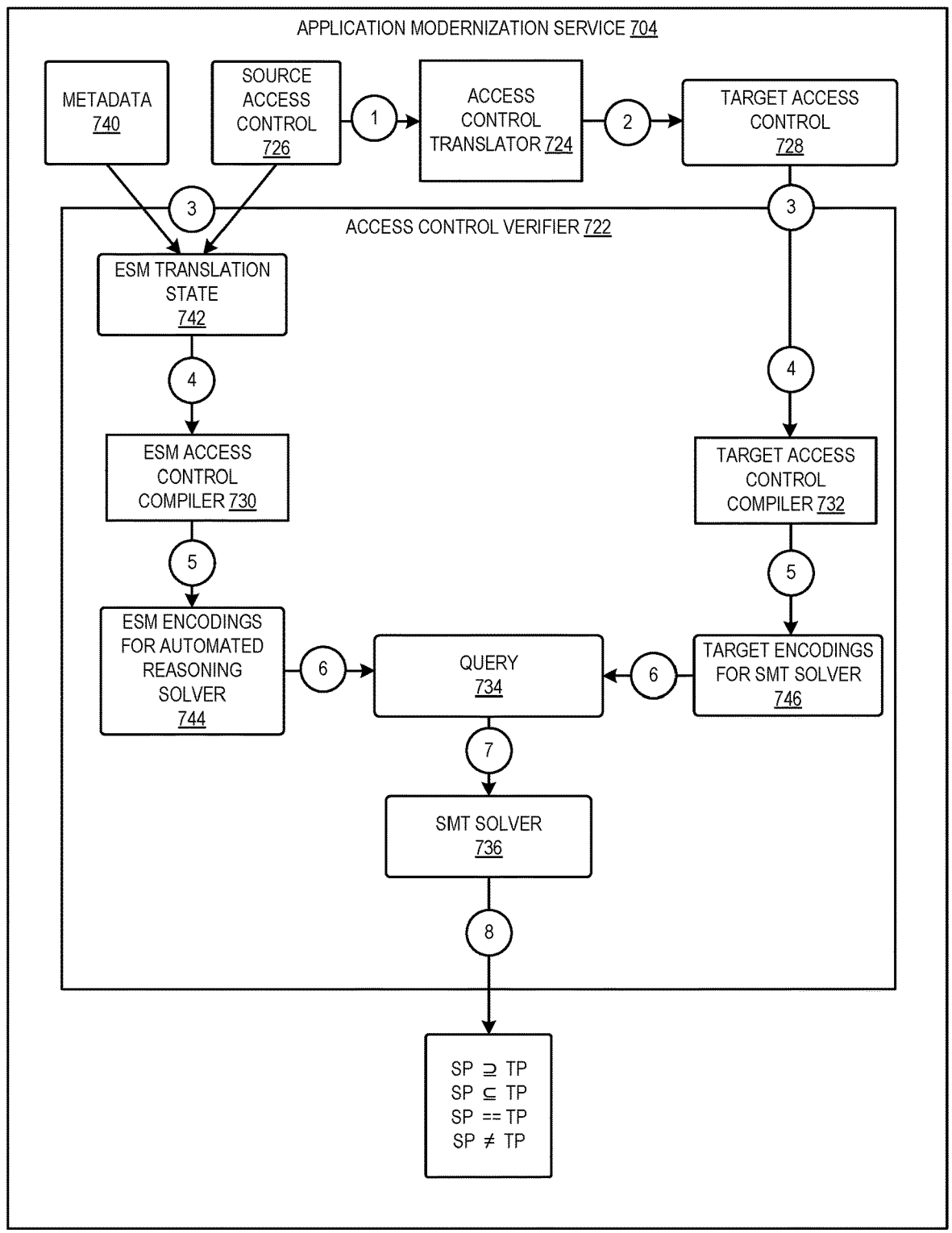
FIG. 7 illustrates an example system and method for verifying translated access controls for application modernization, according to some embodiments.

Example System and Method for Verifying Translated Access Controls for Application Modernization FIG. 7 illustrates an example system and method for verifying translated access controls for application modernization, according to some embodiments. The method is typically performed within the context of application modernization, such as migrating a mainframe application from a customer's mainframe system to a cloud application in a provider network environment. This migration process involves transferring mainframe resources, which are accessed by users of the mainframe system, to cloud resources that are accessed by users of the cloud application. As a result, the access controls governing user access to specific mainframe resources must be migrated to their equivalent access controls for regulating user access to corresponding cloud resources within the provider network environment. Due to the potentially vast number of access control rules in the mainframe environment (reaching thousands or more), manually translating and verifying each individual access control rule is not feasible.

The method described in FIG. 7 can be performed for each source access control within a set of source access controls that are to be migrated from the mainframe environment to the cloud environment. Each source access control can encompass one or more ESM GRP access control rules or one or more ESM dataset profile access control rules. The method's purpose is to translate the "source" ESM GRP or ESM dataset to a corresponding "target" access control. In order to determine whether the target access control is more permissive, less permissive, equivalent, or disjoint compared to the source access control, the method utilizes an automated reasoning (e.g., SMT) solver. The output or result of the method can be a report or other data indicating one of these four possible results. The report can be presented through a command line interface, a graphical user interface, stored in a file system, stored in a database, or transmitted to another computing process for further processing through an application programming interface (API) call.

In some embodiments, if it is determined that the target access control is more permissive than the source access control, indicating a potential security issue for the target access control, the output may include a request that is permitted by the target access control but not by the source access control. This information helps the customer identify and address potential security concerns by taking appropriate remedial action to enhance or rectify the target access control.

In other embodiments, if it is determined that the target access control is less permissive than the source access control, indicating a potential availability issue for the target access control, the output may indicate a request that is permitted by the source access control but not by the target access control. This output assists the customer in recognizing and addressing potential availability concerns by highlighting the need for remedial action to improve or correct the target access control.

In both of these scenarios, the output serves as a valuable resource for the customer, providing insights and guidance to facilitate the identification and resolution of any issues with the target access control.

The following is a simple example of a ESM GRP source access control. The source access control protects a "PAYROLL" resource in a "DATASET" resource class. The owner is "JOHN."

The "HR" group is granted READ and WRITE access. The user "SUSAN" has READ access. And all other users have no access by default.

00: RESOURCE CLASS('DATASET')—
01: ENTITY('PAYROLL')—
02: OWNER('JOHN')—
03: PERMIT(GROUP('HR') ACCESS(READ, WRITE))—
04: PERMIT(INDIVIDUAL('SUSAN') ACCESS (READ))—
05: PERMIT(GENERAL UACC(NONE))

The following is a simple example of a ESM dataset profile source access control. The source access control protects a "CONFIDENTIAL.DATASET" dataset. The owner of the dataset is "JOHN."

The "HR" group is granted READ and WRITE access to the dataset. The user "SUSAN" has READ access to the dataset. And all other users have no access by default.

00: PROFILE DATASET('CONFIDENTIAL.DATASET')—
01: OWNER('JOHN')—
02: PERMIT(GROUP('HR') ACC (READ, WRITE))—
03: PERMIT(INDIVIDUAL('SUSAN') ACC (READ))—
04: PERMIT(GENERAL UACC (NONE))

At step 1 of the method, application modernization service 704 inputs source access control 726 into access control translator 724. Source access control 726 may be a ESM dataset profile or a ESM general resource profile, for example. Access control translator 724 translates source access control 726 to target access control 728.

At step 2, it outputs target access control 728 to application modernization service 704.

Access control translator 724 is configured to understand the structure and semantics of both the ESM system access control format (e.g., RACF) and the target access control format. Translator 724 is configured to map the relevant concepts and access controls from the ESM system access control format to the target access control format.

Such mapping may include translator 724 identifying the types of ESM system resources covered by source access control 726, such as ESM datasets, programs, or system commands. Translator 724 may also determine the corresponding services or resources in the cloud provider network that align with the ESM resources of source access control 726.

For example, the corresponding resources in the cloud provider network might be a data storage container (e.g., a data bucket or a file folder) of a data storage service, a data catalog of a data catalog service, a serverless function of a serverless code execution service, an application programming interface (API) of a service, or other computing, data storage, or networking resource in the cloud provider network that corresponds to a resource or a set of resources in the mainframe system.

Translator 724 may define policy statements in target access control 728 for each resource or resource type of the source access control 726 or for each of one or more source access control authorization steps of the source access control authorization process (e.g., the ESM system authorization process). Translator 724 may map specific access permissions defined in source access control 726 to the appropriate cloud provider network server actions in the policy statements of target access control 728.

For example, translator 724 may map ESM permissions like READ, WRITE, EXECUTE, CONTROL, ALTER, etc., to cloud provider network service actions like "GetObject," "PutObject," "InvokeFunction," or "GetTable."

Translator 724 may map ESM users and groups to principals in target access control 728. For example, translator 724 may determine the ESM users and groups that have permissions defined in source access control 726 and determine the corresponding cloud provider network users or groups that should be associated with target access control 728.

Translator 724 may consider any additional ESM conditions or constraints specified in source access control 726, such as time-based restrictions or network address-based access controls, and translate them to cloud provider network-specific conditions within a statement or statements of target access control 728.

In some embodiments, translator 724 employs artificial intelligence or machine learning techniques to assist in translating source access control 726 to target access control 728.

For example, translator 724 may use natural language processing (NLP) algorithms to analyze and understand the content and structure of ESM system information in source access control 726. An NLP algorithm may be used to extract relevant information from source access control 726, such as resource types, access controls, and permissions.

Additionally, or alternatively, translator 724 may employ a trained machine learning model. This model could be trained based on a dataset of previous translations, mapping existing translated ESM profiles to their corresponding target access controls. The purpose is to learn the mapping patterns and make accurate predictions for new translations, such as translating source access control 726 to target access control 728.

Target access controls used in the cloud provider network may utilize certain condition keys to protect access to resources. These condition keys may have predefined names. For instance, a condition key named "principalTag/username" may hold the value of one or more user names within the target access control in the cloud provider network.

Another example is a condition key named "principalTag/gp1" which may be used to refer to group names. Additionally, a condition key named "principalTag/Atts" could be utilized to refer to operational or special attributes. Similarly, a condition key named "principalTag/userSecLevel" might be used to denote a security level.

These examples provide an illustration of potential predefined condition keys that may be employed in target access controls.

At step 3, source access control 726 and target access control 728 generated from source access control 726 by translator 724 are input to access control verifier 722. The input may also include metadata 740 about source access control 726.

For example, metadata 740 may contain a mapping of values of source access control 726 to condition key names used in target access control 728. Metadata 740 is combined with source access control 726 as ESM translation state 742.

At step 4, ESM translation state 742 is input to ESM access control compiler 730, and target access control 728 is input to the target access control compiler 732.

At step 5, ESM access control compiler 730 encompasses a formal model of the ESM system authorization steps. It utilizes this formal model along with ESM translation state 742 to generate ESM encodings for automated reasoning solver 744.

Also, at step 5, ESM target access control compiler 732 encompasses a formal model of target access controls. It uses this formal model along with target access control 728 to generate target encodings for automated reasoning solver 746.

RSM encodings for automated reasoning solver 744 encode ESM authorization steps in terms of source access control 726 and condition key names of metadata 740. The encoding may encompass, for example, SMT formulas, SMT equations, or other logical or automated reasoning formulas or equations.

Likewise, target encodings for automated reasoning solver 746 encode target access control 728 as a set of SMT formulas, SMT equations, or other logical or automated reasoning formulas or equations.

A logical formula may be a combination of propositional logic (e.g., Boolean variables and logical connectives) and any or all of the following constraints: arithmetic, arrays, bit vectors, sets, strings, or other suitable logical formula constraints.

At steps 6 and 7, ESM encoding for automated reasoning solver 744 and target encodings for automated reasoning solver 746 are input to automated reasoning solver 736 as query 734. Query 734 asks automated reasoning solver 744 to use automated reasoning applied to encodings 744 and 746 to determine if there is an access authorization request that is allowed by one of source access control 726 and target access control 728 but not allowed by the other.

To determine if one (Access Control X) of source access control 726 or target access control 728 is less or equally permissive than the other (Access Control Y), automated reasoning solver 744 is used. It checks if all access authorization requests allowed by access control X are also allowed by access control Y. Additionally, automated reasoning solver 744 is used to check if all access authorization requests allowed by access control Y are also allowed by access control X.

In the case that source access control 726 is less permissive than target access control 728, there is at least one request allowed by target access control 728 that is not allowed by source access control 726. This potential security issue can be flagged in the output to a user, allowing the user to edit or modify the target access control 728 appropriately.

Similarly, in the case that target access control 728 is less permissive than source access control 726, there is at least one request allowed by source access control 726 that is not allowed by target access control 728. This potential availability issue can be flagged in the output to a user, allowing the user to edit or modify the target access control 728 appropriately.

Example Provider Network

Figure 8:
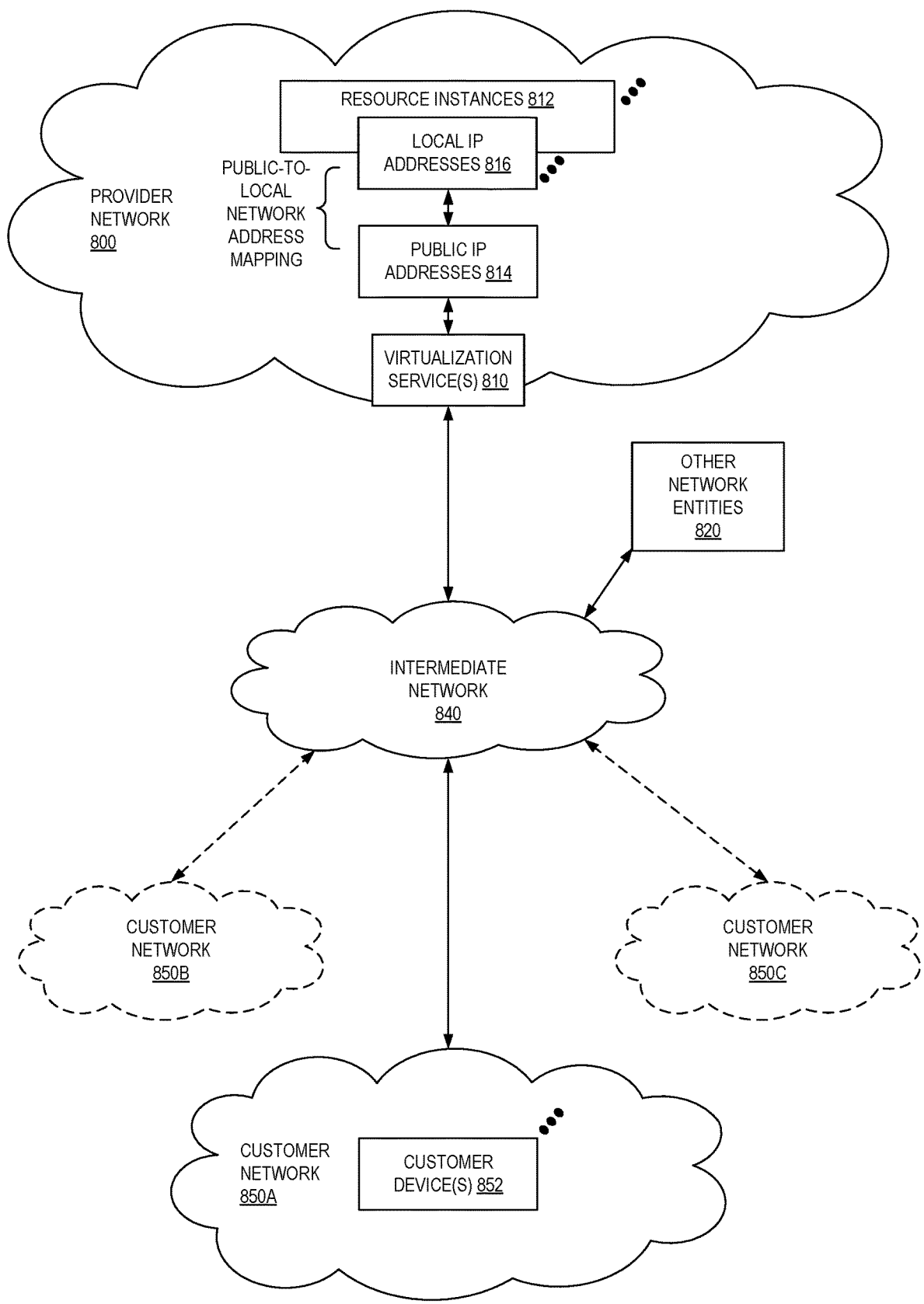
FIG. 8 illustrates an example provider network environment in which the disclosed techniques are implemented, according to some embodiments.

FIG. 8 illustrates example provider network 800 (or "service provider system 800") in which techniques disclosed herein may be implemented. Provider network 800 can provide resource virtualization to multiple customers via one or more virtualization services 810 that allow customers to purchase, rent, or otherwise obtain instances 812 of virtualized resources, including but not limited to computation and storage resources, implemented on computing devices (e.g., computing device 1000 of FIG. 10) within in one or more data centers.

Local Internet Protocol (IP) addresses 816 can be associated with resource instances 812. Local IP addresses 816 may be the internal network addresses of resource instances 812 in provider network 800. In some examples, provider network 800 can also provide public IP addresses 814 (e.g., Internet Protocol version 4 (IPv4) or Internet Protocol version 6 (IPv6) addresses or ranges thereof) that customers can obtain from provider network 800.

Conventionally, provider network 800, via one or more virtualization services 810, can allow a customer of the service provider, such as a customer that operates one or more customer networks 850A-C including one or more customer devices 852, to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Example Provider Network Environment

Figure 9:
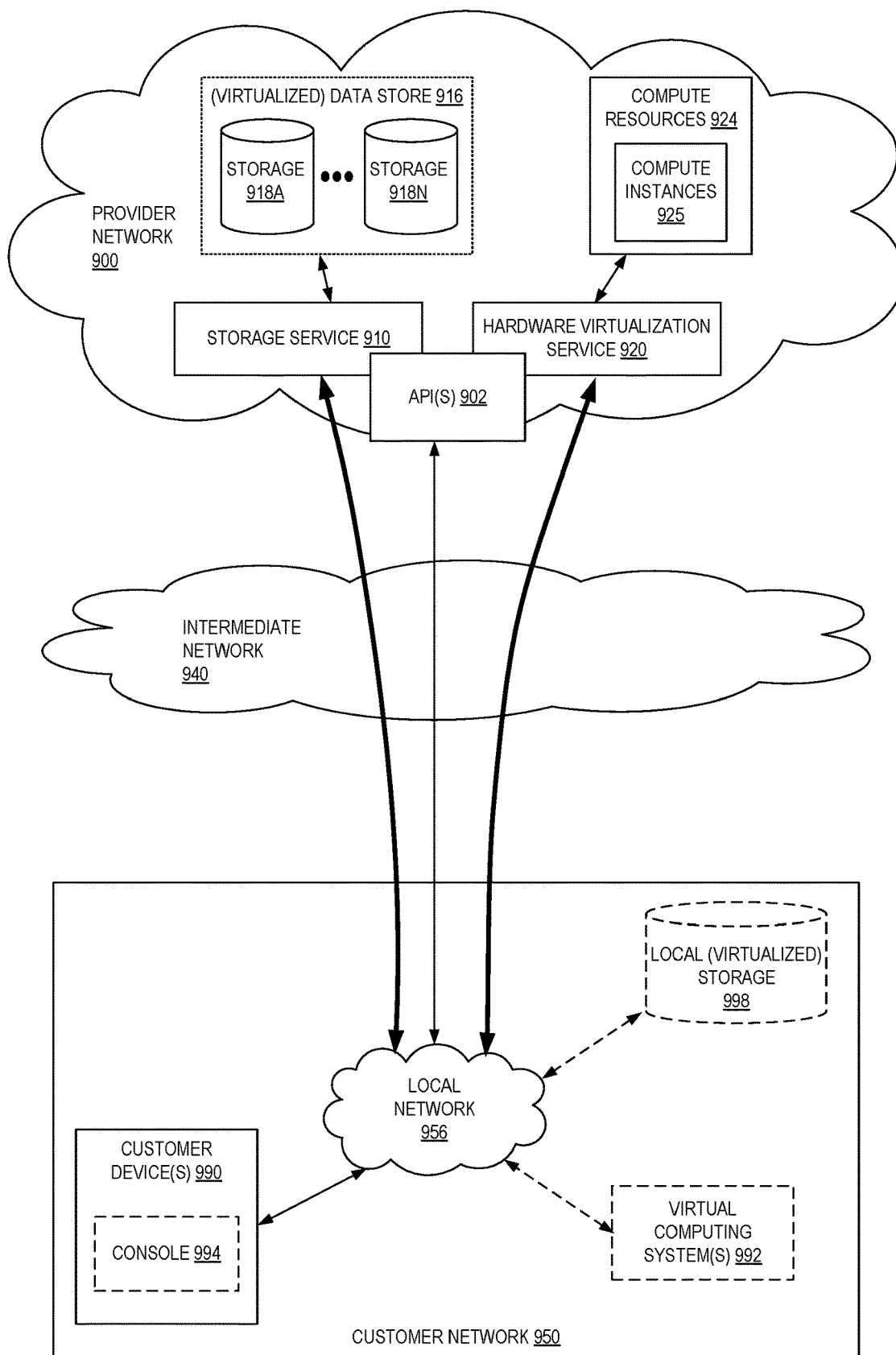
FIG. 9 is a block diagram of an example provider network that provides a storage service and a hardware virtualization service to customers and in which the disclosed techniques are implemented, according to some embodiments.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Example Computing Device

Figure 10:
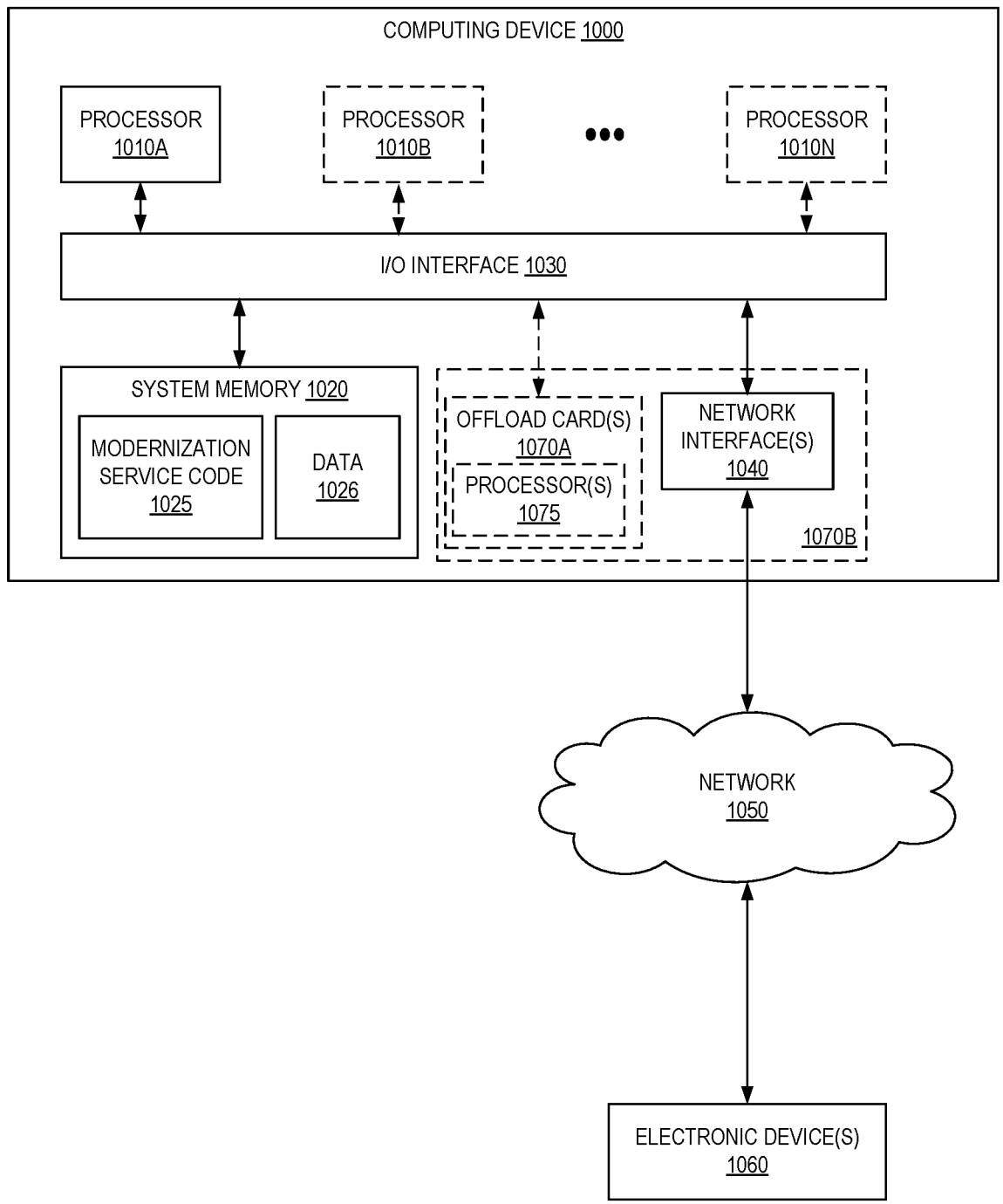
FIG. 10 is a block diagram illustrating an example computer system that is used in some embodiments to implement the disclosed techniques.

FIG. 10 illustrates components of example computing device 1000 for implementing any of the techniques disclosed herein. In FIG. 10, the components are shown as being part of a single computing device 1000, but the components may be distributed among multiple computing devices, such as a system of computing devices, including, for example, one or more end-user computing devices (e.g., a smart phone or a tablet computer) and/or one or more server computing devices (e.g., cloud computing).

Computing device 1000 may include any components typical of a computing device. In the illustrated example, computing device 1000 includes one or more processors 1010A-N coupled to system memory 1020 via input/output (I/O) interface 1030. For example, I/O interface 1030 may include a bus implementing a version of the Peripheral Component Interconnect-Express (PCI-E) standard, or another interconnect such as a QUICKPATH interconnect (QPI) or UltraPath interconnect (UPI)). Computing device 1000 further includes network interface 1040 coupled to I/O interface 1030. Although not illustrated, computing device 1000 may also include any input and output components, such as displays, keyboards, pointing devices, or touch screens.

Techniques disclosed herein may be deployed in part or in whole through a machine that executes computer software, program codes, or other machine instructions on one or more processors 1010A-N. The term "processor" as used herein is meant to include at least one processor and unless context clearly indicates otherwise, the plural and the singular should be understood to be interchangeable. A processor may be any kind of computational or processing device capable of executing program instructions, codes, machine instructions, or the like. For example, one or more processors 1010A-N may include any of: a microprocessor (e.g., a central processing unit (CPU) implementing an instruction set architecture (ISA) such as x86, ARM, x86, ARM, PoewerPC, SPARC, or MIPS); a graphics processor (e.g., a graphics processing unit (GPU)); a field-programmable gate array (FPGA); a digital signal processor (DSP); an application-specific integrated circuit (ASIC); a system on a chip (SoC); or a quantum processor. In multi-microprocessor systems, each of the processors 1010A-N can commonly, but not necessarily, implement the same ISA.

System memory 1020 can store instructions and data accessible by one or more processors 1010A-N. In various examples, system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as techniques disclosed herein, are shown stored within system memory 1020 as application modernization service code 1025 and data 1026. For example, application service code 1025 may be executable to implement, in whole or in part, application modernization service 104 of FIG. 1.

System memory 1020 is one example of a computer-accessible medium configured to store program instructions 1025 and data 1026. Program instructions 1025 and/or data 1026 can be received, sent, or stored upon different types of computer-accessible media including non-transitory storage media such as magnetic or optical media, e.g., disk or DVD/CD coupled to computing device 1000 via I/O interface 1030. Non-transitory storage media can also include any volatile or non-volatile media such as RAM (e.g., SDRAM, double data rate (DDR) SDRAM, SRAM, etc.), read only memory (ROM), etc., that can be included in computing device 1000 as system memory 1020. Further, a computer-accessible medium can include transmission media or signals such as electrical, electromagnetic, or digital signals, conveyed via a communication medium such as a network and/or a wireless link, such as can be implemented via network interface 1040.

I/O interface 1030 can be configured to coordinate I/O traffic between one or more processors 1010A-N, system memory 1020, and any peripheral devices in computing device 1000, including network interface 1040 or other peripheral interfaces. I/O interface 1030 can perform any necessary protocol, timing, or other data transformations to convert data signals from one component (e.g., system memory 1020) into a format suitable for use by another component (e.g., one or more processors 1010A-N). I/O interface 1030 can include support for devices attached through various types of peripheral buses, such as a variant of the Peripheral Component Interconnect (PCI) bus standard or the Universal Serial Bus (USB) standard, for example. A function of I/O interface 1030 can be split into two or more separate components, such as a north bridge and a south bridge, for example. Functionality of I/O interface 1030, such as an interface to system memory 1020, can be incorporated directly into one or more processors 1010A-N.

Network interface 1040 can be configured to allow data to be exchanged between computing device 1000 and other electronic device(s) 1060 attached to network 1050 (e.g., the internet), such as other computer systems or devices as illustrated in the figures, for example. Network interface 1040 can support communication via any suitable wired or wireless general data networks, such as types of Ethernet network, for example. Network interface 1040 can support communication via telecommunications/telephony networks, such as analog voice networks or digital fiber communications networks, via storage area networks (SANs), such as Fibre Channel SANs, and/or via any other suitable type of network or protocol.

Computing device 1000 may include one or more offload cards 1070A or 1070B (including one or more processors 1075, and possibly including network interface 1040) that are connected using I/O interface 1030. For example, in some examples computing device 1000 can act as a host electronic device (e.g., operating as part of a hardware virtualization service) that hosts compute resources such as compute instances (e.g., virtual machine or container instances), and one or more offload cards 1070A or 1070B execute a virtualization manager that can manage compute instances that execute on the host electronic device. The virtualization manager can perform compute instance management operations, such as pausing and/or un-pausing compute instances, launching and/or terminating compute instances, performing memory transfer/copying operations, etc. These management operations can be performed by the virtualization manager in coordination with a hypervisor (e.g., upon a request from a hypervisor) that is executed by one or more processors 1010A-N of computing device 1000. Alternatively, the virtualization manager may be configured to perform management operations without needing to coordinate with a hypervisor.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network for supporting communications using any of a variety of protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), APPLETALK, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP or HTTPS servers, File Transfer Protocol (FTP) servers, Common Gateway Interface (CGI) servers, data servers, JAVA servers, business application servers, etc. The server(s) also can be capable of executing programs or scripts in response requests from user devices, such as by executing one or more web applications that can be implemented as one or more scripts or programs written in any programming language, such as JAVA, C, C# or C++, or any scripting language, such as Perl, Python, PHP, or TCL, as well as combinations thereof. The server(s) can also include database servers, including without limitation those commercially available from ORACLE, MICROSOFT, SYBASE, IBM, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Non-transitory storage media for containing instructions and data, or portions of instructions or data, can include but not limited to volatile and non-volatile, removable and non-removable media implemented in any method or technology for storage of information such as computer readable instructions, data structures, program modules, or data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device.

EXTENSIONS AND ALTERNATIVES AND TERMINOLOGY

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method for verifying translated access controls for application modernization, the method comprising:
   obtaining, by an application modernization service of a provider network, one or more source access controls;
   translating, by the application modernization service, the one or more source access controls to one or more target access controls;
   compiling, by the application modernization service, the one or more source access controls into a one or more first encodings of the one or more source access controls for an automated reasoning solver;
   compiling, by the application modernization service, the target access control into a second one or more encodings of the target access control for the automated reasoning solver;
   using the one or more first encodings and the one or more second encodings to query the automated reasoning solver;
   receiving, by the application modernization service, an indication from the automated reasoning solver that the one or more source access controls are less permissive that than the one or more target access controls; and
   outputting an indication to a graphical user interface, a command line interface, or a database that the one or more target access controls permit an authorization request that is not permitted by the one or more source access controls.

2. The computer-implemented method of claim 1, wherein the one or more source access controls comprise an External Security Manager (ESM) general resource profile, an ESM dataset profile, or an ESM custom profile.

3. The computer-implemented method of claim 1, wherein the automated reasoning solver comprises an automated theorem provider; wherein the one or more first encodings comprise a first Satisfiability Modulo Theories (SMT) formula for a source access control of the one or more source access controls; and wherein the one or more second encodings comprises a second SMT formula for a target access control of the one or more target access controls.

4. The computer-implemented method of claim 1, wherein translating, by the application modernization service, the one or more source access controls to the one or more target access controls is based on a model of one or more steps of an External Security Manager (ESM) system authorization process for evaluating access authorization requests.

5. The computer-implemented method of claim 1, wherein compiling, by the application modernization service, the one or more source access controls into the one or more first encodings is based on one or more steps of an External Security Manager (ESM) system authorization process for evaluating access authorization requests.

6. The computer-implemented method of claim 1, wherein the one or more source access controls are used to control access to one or more resources in a mainframe computing environment.

7. The computer-implemented method of claim 1, wherein the one or more first encodings of the one or more source access controls for the automated reasoning solver is in terms of one or more condition key names used in one or more access control policy statements of the one or more target access controls.

8. The computer-implemented method of claim 1, wherein the one or more target access controls comprises a set of one or more access control policy statements, each statement of the set of one or more access control policy statements specifying: an effect, at least one action of a service in the provider network, and at least one resource in the provider network.

9. The computer-implemented method of claim 1, further comprising:
  migrating a first resource of a mainframe computing system to the provider network as a second resource in the provider network, wherein the one or more source access controls control access to the first resource in the mainframe computing system; and
  deploying the one or more target access controls in the provider network to control access to the second resource in the provider network.

10. The computer-implemented method of claim 1, further comprising:
  outputting the authorization request that is not permitted by the one or more source access controls to a graphical user interface, a command line interface, or a database.

11. The computer-implemented method of claim 1, further comprising:
  deploying a modified version of the one or more target access controls that does not permit the authorization request that is not permitted by the one or more source access controls to an identity and access management service in the provider network.

12. A computer-implemented method for verifying translated access controls for application modernization, the method comprising:
  obtaining, by an application modernization service of a provider network, one or more external security manager (ESM) access control profiles;
  translating, by the application modernization service, the one or more ESM access control profiles to one or more target access control policies, the one or more target access control policies comprising a set of one or more access control policy statements, each statement of the set of one or more access control policy statements specifying: an effect, at least one action of a service in the provider network, and at least one resource in the provider network;
  compiling, by the application modernization service, the one or more ESM access control profiles into one or more first encodings of the one or more ESM access control profiles for an automated reasoning solver;
  compiling, by the application modernization service, the one or more target access control policies into one or more second encodings of the one or more target access control policies for the automated reasoning solver;
  using the one or more first encodings and the one or more second encodings to query the automated reasoning solver;
  receiving an indication from the automated reasoning solver that the one or more ESM access control profiles are less permissive that than the one or more target access control policies; and
  outputting an indication to a graphical user interface, a command line interface, or a database that the one or more target access control policies allow an authorization request that is not allowed by the one or more ESM access control profiles.

13. The computer-implemented method of claim 12, wherein the one or more External Security Manager (ESM) access control profiles comprise an ESM general resource profile, an ESM dataset profile, or an ESM custom profile.

14. The computer-implemented method of claim 12, wherein the one or more first encodings comprise a first Satisfiability Modulo Theory (SMT) formula of an External Security Manager (ESM) profile of the one or more ESM profiles; and wherein the one or more second encodings comprise a second SMT formula for a target access control policy of the one or more target access control policies.

15. A system for verifying translated access controls for application modernization, the system comprising:
  a first one or more electronic devices comprising at least one processor and at least one memory to implement an identity and access management service in a multi-tenant provider network; and
  a second one or more electronic devices comprising at least one processor and at least one memory to implement an application modernization service in the multi-tenant provider network, the application modernization service configured to:
    obtain a source access control;
    translate the source access control to a target access control;
    compile the source access control into a first encoding of the source access control for a logical solver;
    compile the target access control into a second encoding of the target access control for the logical solver;
    use the first encoding and the second encoding to query the logical solver;
    receive an indication from the logical solver that the source access control is less permissive that than the target access control; and
    output an indication to a graphical user interface, a command line interface, or a database that the target access control permits an authorization request that is not permitted by the source access control.

16. The system of claim 15, wherein the source access control comprises a resource access control framework (RACF) general resource profile or a RACF dataset profile.

17. The system of claim 15, wherein the logical solver comprises a satisfiability modulo theories (SMT) solver; wherein the first encoding comprises a first SMT formula of the source access control for the SMT solver; and wherein the second encoding comprises a second SMT formula of the target access control for the SMT solver.

18. The system of claim 15, wherein the application modernization service is configured to translate the source access control to the target access control based on a model of resource access control framework (RACF) authorization step.

19. The system of claim 15, wherein the application modernization service is configured to compile the source access control into the first encoding of the source access control for the logical solver based on one or more resource access control framework (RACF) authorization steps of a RACF process for evaluating access authorization requests.

20. The system of claim 15, wherein the indication indicates a portion of the target access control that permits the authorization request.

\* \* \* \* \*